United States Patent [19]

Fujiwara et al.

[11] Patent Number: 4,810,965
[45] Date of Patent: Mar. 7, 1989

[54] POSITION DETECTING APPARATUS USING A MAGNETIC SENSOR AND A CLOSED MAGNETIC CIRCUIT WITH NON-UNIFORM MAGNETIC FLUX DISTRIBUTION

[75] Inventors: Yoshiro Fujiwara, Kawasaki; Michiko Endo, Yokohama; Yuji Kojima, Chigasaki; Noboru Wakatsuki, Kawasaki; Akira Hirano, Sagamihara; Kazunari Komenou, Atsugi, all of Japan

[73] Assignee: Fujitsu Limited, Kawasaki, Japan

[21] Appl. No.: 906,027

[22] Filed: Sep. 11, 1986

[30] Foreign Application Priority Data

| Sep. 13, 1985 | [JP] | Japan | 60-202832 |
| Jan. 20, 1986 | [JP] | Japan | 61-009566 |
| Jan. 20, 1986 | [JP] | Japan | 61-009569 |
| Jan. 20, 1986 | [JP] | Japan | 61-009570 |
| Feb. 20, 1986 | [JP] | Japan | 61-036351 |
| Mar. 10, 1986 | [JP] | Japan | 61-050541 |
| Mar. 31, 1986 | [JP] | Japan | 61-073223 |

[51] Int. Cl.⁴ ............ G01B 7/14; G01R 33/04; H01L 43/08
[52] U.S. Cl. .................... 324/208; 324/252; 338/32 R
[58] Field of Search ........... 324/207, 208, 251, 252; 338/32 R, 32 H; 336/30, 45

[56] References Cited

U.S. PATENT DOCUMENTS

| 3,473,109 | 10/1969 | Maaz et al. | 324/208 |
| 4,013,986 | 3/1977 | Weckenmann | 336/75 |
| 4,142,218 | 2/1979 | Gorter | 360/113 |

FOREIGN PATENT DOCUMENTS 2134860 2/1973 Fed. Rep. of Germany .
2325752 3/1975 Fed. Rep. of Germany .
61-70478 11/1968 Japan .

OTHER PUBLICATIONS

Electronic Components and Applications, vol. 5, No. 3, Jun. 1983, "The Magnetoresistive Sensor-A Sensitive Device for Detecting Magnetic Field Variations", by U. Dibbern et al., pp. 148–153.
J. S. Y. Feng, "Magnetic Self-Bias in the Barber Pole MR Structure", Sep. 1977, vol. MAG-13, No. 5, pp. 1466–1468.
K. E. Kuijk, "The Barber Pole, A Linear Magnetoresistive Head", Sep. 1975, IEEE Transactions on Magnetics, vol. MAG-11, No. 5, pp. 1215–1217.

Primary Examiner—Reinhard J. Eisenzopf
Assistant Examiner—Walter E. Snow
Attorney, Agent, or Firm—Staas & Halsey

[57] ABSTRACT

A position detector having a magnetic sensor for measuring linear or angular displacement, or detecting a position of a body without contact thereto. The detector has a closed circuit including magnets and yokes. The magnetic leakage flux which emanates from the inside surfaces of the yokes is utilized to detect the position of the body. The magnetic sensor is transferred along the inside surfaces of the yokes by a transferring circuit, which senses the magnetic field intensity of the leakage flux distributed thereon. This enables the detector to have a longer measuring range than that of a prior art detectors. An output signal is stable due to the shielding effect of the yokes. The magnetic closed circuit has many magnetic and mechanical configurations. For example, for the magnet, a permanent magnet and an electromagnet can be used. Further, improvements are proposed for enhancing the linearity of the output signal voltage with respect to the transferring distance of the sensing element and for compensating the offset drift of an amplifier or changing the coercive force of permanent magnets.

46 Claims, 19 Drawing Sheets

PRIOR ART

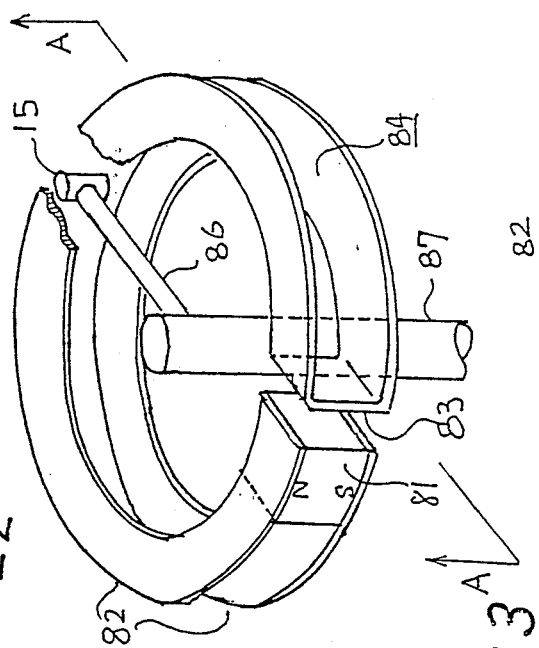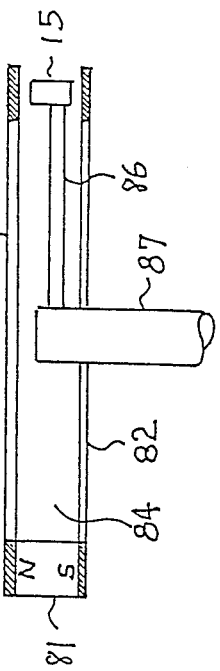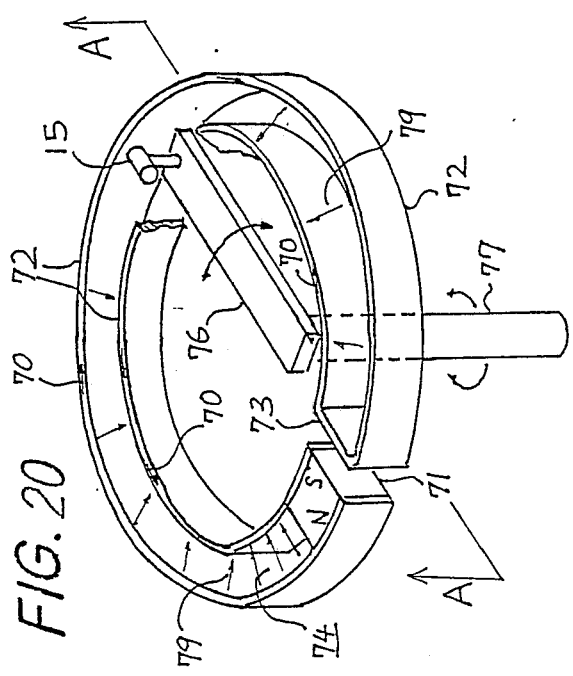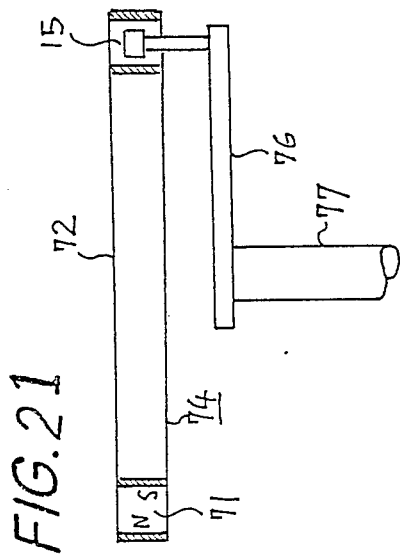
FIG.22
FIG.23
FIG.20
FIG.21

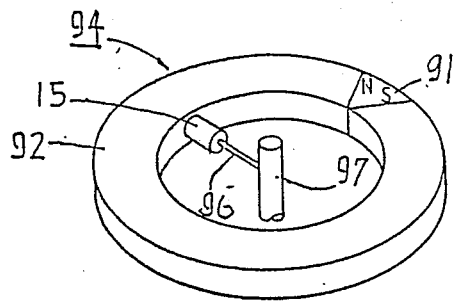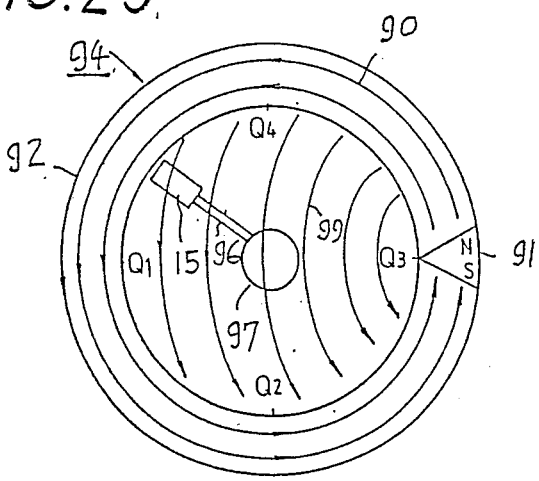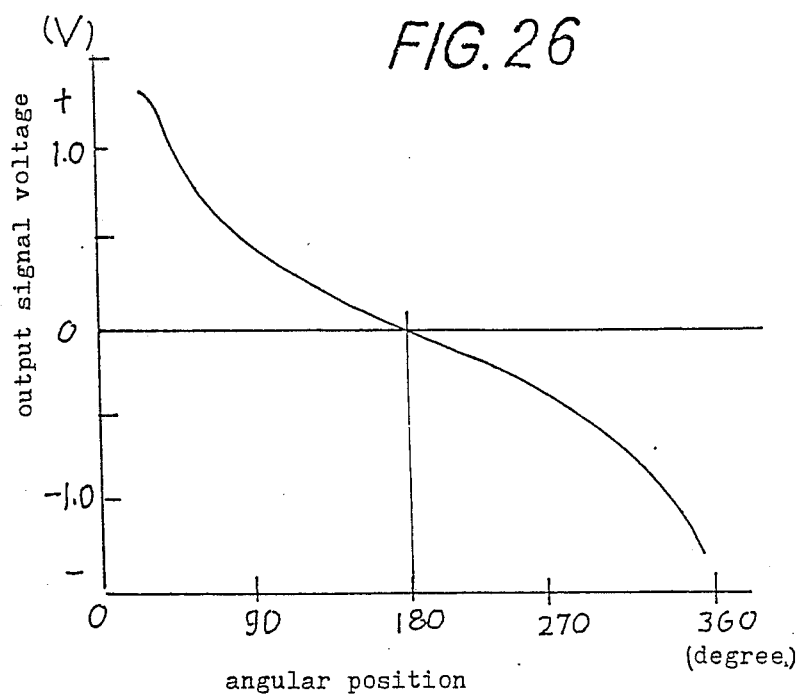

FIG.46
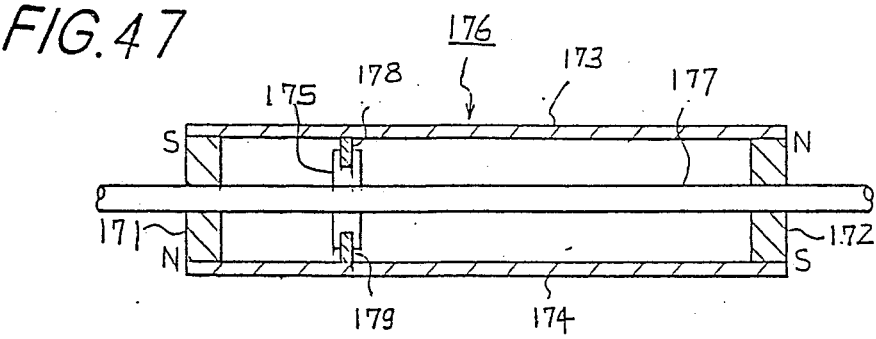
FIG.47
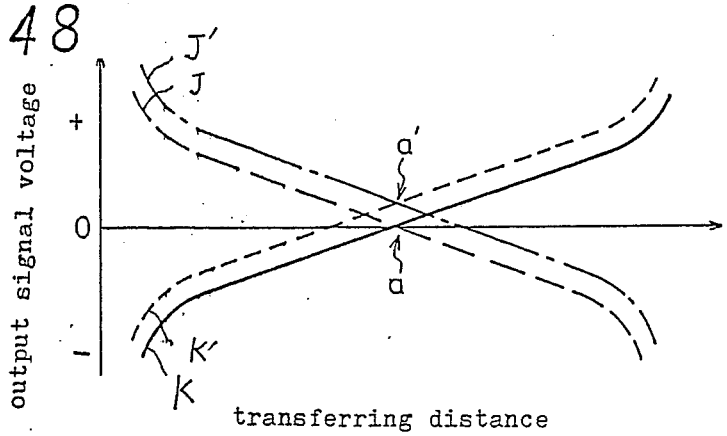
FIG.48
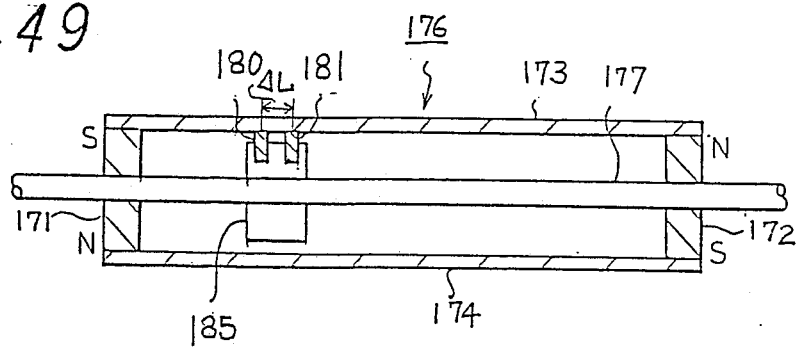
FIG.49

POSITION DETECTING APPARATUS USING A MAGNETIC SENSOR AND A CLOSED MAGNETIC CIRCUIT WITH NON-UNIFORM MAGNETIC FLUX DISTRIBUTION

BACKGROUND OF THE INVENTION

The present invention is directed to an apparatus for locating or detecting the absolute position of a body of interest without contacting the body by using a magnetic sensor. More particularly, the present invention is directed to a magnetic position detector having a long measuring range.

Recently, various types of non-contact distance measuring instruments have been developed for measuring linear and angular displacement and detecting absolute position of a body in linear or angular systems. There are various types of non-contact measuring position detecting apparatus. An instrument utilizing a sliding resistor potentiometer is a classic example, but is not reliable. An optical position device has an optical sensor which reads out an optical scale such as a slit scale, but the construction of the device is rather complicated. Further, there is a magnetic scale wherein a scale written into a magnetic medium is read out by a magnetic sensor. Its structure, however, is also complicated and an absolute position of a body cannot be measured, only the distance between two arbitrary points can be measured. The present invention is intended to provide a magnetic position detecting apparatus capable of detecting the absolute position of a body to be detected, having a fairly simple structure, a long measuring region, and high reliability.

FIG. 1 is a schematic perspective view of a prior art apparatus for detecting a position (hereinafter referred to as a position detector), wherein a permanent magnet 1 is arranged in parallel facing a magnetic sensor 2. The distance L between the magnet 1 and the magnetic sensor 2 is variable. That is, relative movement between both members is allowed. It should be noted that the magnetic sensor 2 is transferred in the direction of the pole axis of the magnet 1. The magnetic field emanating from the permanent magnet 1 is sensed by a sensitive magnetic sensing element in the magnetic sensor 2. The distance L is detected and output in the form of a signal from the magnetic sensor 2.

FIG. 2 is a graph of the relationship between the distance L and the output signal voltage of the magnetic sensor 2 of a prior art position detector. The coercive force of the permanent magnet 1 is 800 Oe and the magnetic sensing element of sensor 2 is made of a magnetoresistive thin film. The effective distance $L_{eff}$ (the portion of the curve which is fairly linear and available for practical measuring), is rather short, approximately 4 to 30 mm.

There are various types of elements employed in a magnetic sensor such as a coil for sensing an induced magnetic field, a hole-effect semiconductor element, and a ferro-magnetic magnetoresistive element. Among them, the magnetoresistive sensing element has the ability to change its resistivity in the presence of an external magnetic field. The element is stable with respect to changes in the environmental temperature and is suitable for sensing a micro-magnetic field. Before proceeding further, the structure of a magnetic sensor of this type, which is disclosed in Japanese Provisional Publication of the Patent Application SHO No. 61-70478 to Hirano, published Apr. 11, 1986, will be described briefly.

FIG. 3 is a partial plan view of a magnetic sensing element 5, and FIG. 4 is a cross-sectional view of the magnetic sensor 2. In FIG. 4, the magnetic sensing element 5 shown in FIG. 3 is patterned in a meandering pattern and formed from a magnetoresistive thin film of Permalloy (Fe-Ni) deposited on a silicon substrate 3 by lithographic technology. Thereafter, the patterned magnetoresistive element is subject to a heat treatment so as to be magnetized in a longitudinal direction. Then striped gold conductive layers 7 obliquely crossing the element pattern are deposited thereon, adhering to the magnetoresistive pattern through intermediate layers 6 of Ti or Cr, which are previously formed. The element formed in this configuration is referred to as a "barber-pole type" element, which is described in various references such as *Electronic Components and Applications*, page 148, Vol. 5, No. 3, June 1983, by U. Dibbern and A. Petersen. The sensor is then covered with a passivation film 8 for protection against environmental hazards and lead terminals 9 are formed on the substrate 3. The feature of the magnetic sensor proposed by Hirano is that the striped pattern is formed over all the paths of the meandering magnetic sensing element including both going and returning paths, while other conventional elements have the striped pattern formed on only one side of the path.

FIG. 5 is a schematic plan view of four magnetoresistive sensing elements of a barber-pole type, connected to form four arms of a Wheatstone bridge having a pair of input and output terminals and formed on substrate 3. The degree of bridge imbalance is used to indicate the magnetic field intensity which is indicated by the arrow Hex in the figure.

FIG. 6 is a graph of the characteristics of the barber-pole type magnetic sensor of FIGS. 3, 4 and 5, wherein the external magnetic field intensity Oe is plotted with respect to the abscissa and the output voltage mV of the sensor is plotted with respect to the ordinate. As can be seen in FIG. 6, the characteristic curve of the magnetic sensor is satisfactorily straight, and extends from the negative to the positive direction. This means that the barber-pole type magnetoresistive sensor has a sensing polarity peculiar to its magnetizing direction.

Since barber-pole type elements sense the magnetic flux only in parallel with the plane of the Permalloy strips, their sensitivity shows a sharp peak value when the magnetic sensing element 5 is positioned on a plane in parallel with the magnetic flux lines. This results in a fairly high resolution capability of the magnetic sensor for detecting the position of a body of interest. On the other hand, accurate transferring motion of the magnetic sensor is required so that the plane of the magnetoresistive sensing element is always kept in parallel with the plane of the magnetic flux lines to be sensed.

In the following description of the present invention, the magnetic sensor employed is assumed to have a barber-pole type magnetoresistive sensing element. Therefore, a common reference numeral (15) is used throughout for denoting the magnetic sensor appearing in the following description unless otherwise mentioned.

The prior art position detector, as described above, has a short sensing region. This is because the magnetic field to be sensed by the magnetic sensor 2 emanates in a direction perpendicular to the pole face of the permanent magnet 1. In other words, the magnetic sensor 2 moves in the direction of the magnetic pole axis. The magnetic field intensity in this direction, therefore, decreases very sharply with an increase in the distance from the pole surface, and is inversely proportional to the square of the distance L. Thus, a magnetic position detector having a longer sensing region is needed.

SUMMARY OF THE INVENTION

It is an object of the present invention to provide a magnetic position detector having a long measuring region.

It is another object of the present invention to provide a position detector capable of detecting an absolute position of a body of interest.

It is still another object of the present invention to provide a magnetic position detector having a simple and less expensive construction and also a reliable measuring function.

The present invention proposes an improved magnetic position detector having a longer measuring range than that of the prior art. The position detector of the present invention has a closed magnetic circuit comprising one or more magnets and a pair of yokes made of magnetic material. The major part of the magnetic flux emanating from the magnet is guided so as to circulate in the closed magnetic circuit through the yoke. The remaining magnetic flux emanates from the surfaces of the yokes into the air space inside and outside the closed magnetic circuit. This is referred to as leakage magnetic flux (hereinafter referred to as leakage flux). The magnetic sensor is designed to move along one of the yoke surfaces which faces the inside of the closed magnetic circuit, keeping a distance therefrom, and sensing the magnetic leakage flux therein. The surface is limited to that facing the inside of the closed magnetic circuit (hereinafter referred to as the inside surface), because the outside of the closed magnetic circuit is apt to be subject to external magnetic disturbance, such as the approach of other magnetic bodies, thus causing an erroneous measurement. In the following, throughout the description, the magnetic sensor, except as otherwise mentioned, is assumed to move along the inside surface of a yoke. The closed magnetic circuit is also designed so that the leakage flux therein has a density distribution as linear as possible along the longitudinal direction of the yoke. The linear distribution of the leakage flux density or leakage flux intensity along the longitudinal direction of the yoke assures a linear characteristic of the output voltage from the magnetic sensor as long as a high linearity magnetic sensor, such as a barber-pole type magnetic sensor, is used. To achieve a more linear characteristic, a yoke having a continuously reduced cross-sectional area of the yoke along the longitudinal direction is proposed.

According to the present invention, three types of position detectors are proposed. The first type of position detector is one having a pair of yokes, i.e., rail-road like yokes, which extend in a predetermined path such as a straight path, a circular path, an S-shaped path, etc. The inside surfaces of the yokes are substantially parallel to each other. This type of position detector has an advantage that the length of the path of the relevant leakage flux starting from one side of the inside surface and reaching the other side, is almost constant, resulting in approximately constant air permeance for the leakage flux. This favorably affects the linearity of the position detector.

The second type of position detector has a single yoke (except for a U-type yoke), in which a permanent magnet is embedded. A single circular yoke is one example. The simple structure is an advantage, but the linearity of the measuring characteristics is rather unsatisfactory.

The third type of position detector is a coaxial type position detector wherein a tube and a rod, both of which are made of magnetic material, are employed as yokes. At one end (or both ends), one permanent magnet (or a pair of permanent magnets) is (are) arranged, and a magnetic sensor transfers flux along the inner side wall of the tube (a yoke). This type of position detector has an advantage that the magnetic sensor is completely shielded from external magnetic disturbance. Also, some rotating movement around the transferring axis during the transferring of the magnetic sensor is allowed because the magnetic field distribution of the leakage flux is quite symmetrical with respect to the axis. In addition, the mechanical structure of this type of position detector is rugged and dust-proof.

Several improvements of the above-mentioned three types of position detectors are proposed. As a coercive force generator, an electromagnetic coil is introduced instead of permanent magnets. This reduces the external magnetic disturbance by using a high frequency alternating exciting current, and further, does not require the difficult machining of permanent magnets which is necessary in some cases. In addition, the forming of sharp protrusions on the inside surface of a yoke serves to enhance the generation of leakage flux, allowing the use of a favorably weak coercive force.

With the aid of a relatively heavy enclosure of magnetic material covering a magnetic sensor of a magnetic position detector, it is possible to provide the magnetoresistive sensing element with magnetizing characteristics having hysteresis. This serves to depress a chattering reaction of the magnetic sensor when the magnetic position detector is used as a switching means for a device, for example, a level meter for an oil tank of a car, wherein a repeating up and down movement of the position detector occurs when the detection is used as a floating element.

In summary, as easily understood from the above description, the position detector according to the present invention is distinguished over the prior art by the fact that the leakage flux from an inside surface of a fairly long yoke is utilized to measure the distance of the position of a body of interest; whereas in the prior art leakage flux directly emanating from a pole surface of a permanent magnet in the direction of the pole axis is utilized. As a result, the measuring range of the position detector of the present invention is greater than that of prior art devices.

These objects and advantages, which will be subsequently apparent, reside in the details of the circuit configuration hereinafter described and claimed, and with reference to the accompanying drawings, wherein like numerals refer to like parts throughout.

BRIEF DESCRIPTION OF THE DRAWINGS

FIG. 20 is a perspective view of a fifth embodiment according to the present invention having a pair of co-axially arranged circular yokes and a permanent magnet;

FIG. 21 is a cross-sectional view taken along the line A—A of FIG. 20;

FIG. 22 is a perspective view of a sixth embodiment according to the present invention having a pair of horizontally arranged circular yokes and a permanent magnet;

FIG. 23 is a cross-sectional view taken along the line A—A of FIG. 22;

FIG. 24 is a schematic perspective view of a seventh embodiment according to the present invention having a single circular yoke;

FIG. 25 is a schematic plan view of the seventh embodiment of FIG. 24, illustrating the magnetic flux lines circulating through the structure;

FIG. 26 is a diagram of the signal output voltage characteristics of the seventh embodiment of FIG. 24;

FIG. 46 is a magnified partial cross-sectional view of a fifteenth embodiment according to the present invention and the inside surface of the yoke having densely formed groove stripes;

FIG. 47 is a schematic cross-sectional plan view of a sixteenth embodiment according to the present invention having a pair of magnetic sensing elements whose polarity axes are arranged in mutually opposite directions;

FIG. 48 is a graph of the output signal voltage versus transferring distance characteristic of the sixteenth embodiment of FIG. 47;

FIG. 49 is a schematic cross-sectional plan view of a seventeenth embodiment according to the present invention having a magnetic sensor with twin magnetic sensing elements positioned in parallel;

DESCRIPTION OF THE PREFERRED EMBODIMENTS

Figure 7:
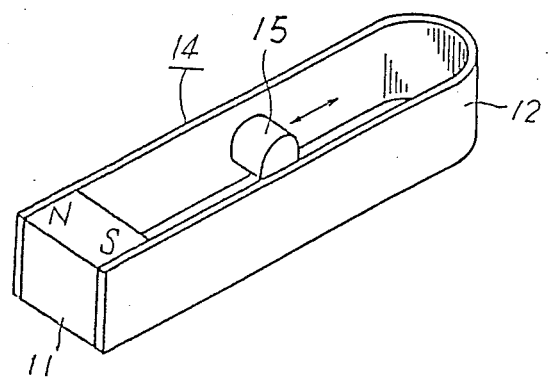
FIG. 7 is a perspective view of a first embodiment according to the present invention having a closed magnetic circuit formed from a U-shaped yoke.
Figure 8:
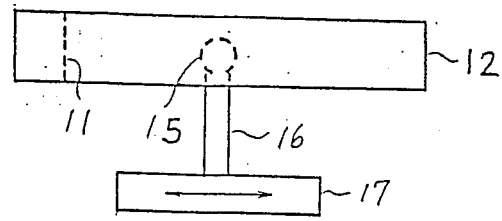
FIG. 8 is a schematic front view of the first embodiment.
Figure 9:
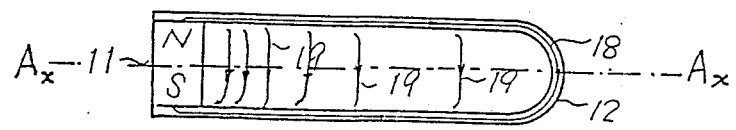
FIG. 9 is a schematic plan view of the path of magnetic flux in the first embodiment.
Figure 10:
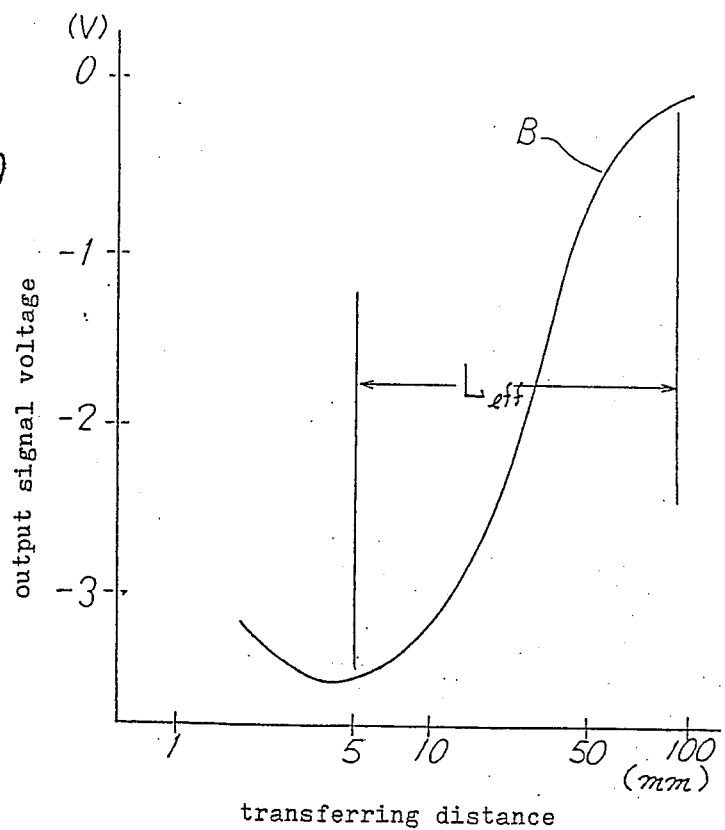
FIG. 10 is a graph of the output signal voltage of the first embodiment obtained empirically, illustrating the magnetic intensity distribution.

Position detectors according to the first embodiment of the present invention have rail-road like yokes and a simple structure. The perspective view of FIG. 7, the front view of FIG. 8, and the plan view of FIG. 9, all show the first embodiment. The position detector has a closed magnetic circuit 14 comprising a U-shaped yoke 12, a permanent magnet 11, and a magnetic sensor 15 having a magnetoresistive sensing element such as a barber-pole type element. The yoke 12 is made from a ribbon-like thin magnetic plate, for example, an iron plate having a thickness of 0.4 mm thickness. The bent portion of the U-shaped yoke 12 forms one end of the closed magnetic circuit 14. At the other end, both the N pole face and the S pole face of the permanent magnet 11 are securely attached to the inner walls of yoke plate 12, forming the closed magnetic circuit 14. A magnetic sensor 15 is fixed to a transferring base 17 by a supporting member 16 which is movable along a guide means (not shown) so that the magnetic sensor 15 is movable along the inside surface of one side of the U-shaped yoke 12. Magnetic flux lines 18 emanating from the N pole run through the yoke 12 and return to the S pole. A portion of the flux lines emanate from both surfaces of the yoke 12 on the outside (not shown) and on the inside of the closed magnetic circuit 14 as leakage flux lines. Only the leakage flux lines 19, directed to the inside of the closed magnetic circuit 14, are of interest. These leakage flux lines run across the inside air space of the closed magnetic circuit 14 in a direction substantially perpendicular to the inside surfaces of the yoke 12. However, in the air space extremely close to the inside surfaces, the magnetic leakage flux lines tend to curve toward the permanent magnet 11. The magnetic field intensity of the leakage flux 19 is highest at the side of permanent magnet 11 and gradually decreases along the axis Ax of the yoke 12. Theoretically, the intensity distribution of the leakage flux 19 is proportional to three-halves the power from the distance from the magnet 11. However, by selecting appropriate constants, a slow decrease in the magnetic intensity distribution can be obtained. For example, an empirically obtained magnetic intensity distribution is shown in FIG. 10 on a logarithmic scale, wherein the output signal voltage V of the magnetic sensor 15 is on the ordinate and the distance L in mm from the permanent magnet 11 is on the abscissa. The coercive force of the permanent magnet 11 is 800 Oe and the output signal of the magnetic sensing element of the magnetic sensor 15 is amplified 100 times. The resulting distribution is plotted as curve B of FIG. 10. The measuring range, $L_{eff}$, is where the distribution curve is almost linear. In FIG. 10, $L_{eff}$, ranges from 5 mm to 90 mm. The disturbance of the external magnetic field is fairly reduced to some degree because of some shielding effect of the yoke 12 on the magnetic field inside the closed magnetic circuit 14, as described before. Thus, with the position detector of the first embodiment, fairly accurate and reliable position detecting is possible.

Figure 11:
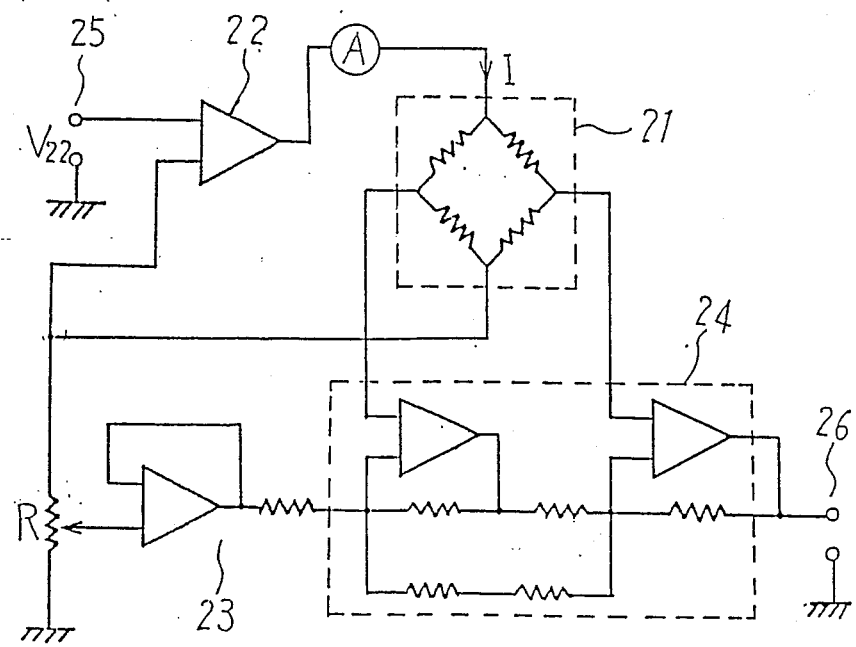
FIG. 11 is a wiring diagram of a circuit employing the magnetic sensor of FIG. 7.

FIG. 11 is a circuit diagram of the magnetic sensor 15. The magnetic sensing elements are represented by an equivalent circuit 21 of a Wheatstone bridge. The voltage $V_{22}$ is input to a constant current amplifier 22 and is variable so as to make the current to the bridge circuit 21 adjustable. When a magnetic field is not applied thereto, the initial balancing of the circuit 21 is achieved by adjusting a variable resistance R and its associated amplifier 23. When a magnetic field is applied to the magnetic sensing element, the resulting imbalanced output voltage of the bridge circuit 21 is amplified approximately 100 times by a differential amplifier 24 and output from the output terminals 26. This circuit can also be employed for the other embodiments of the present invention which will be described in the following.

Figure 12:
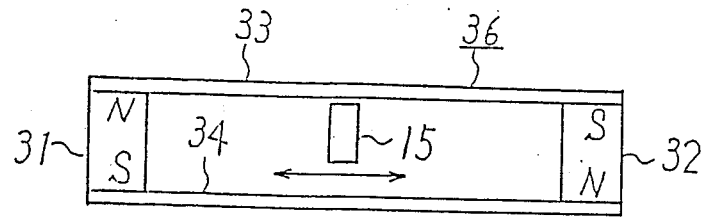
FIG. 12 is a schematic plan view of a second embodiment of the present invention having two permanent magnets and two straight yokes.
Figure 13:
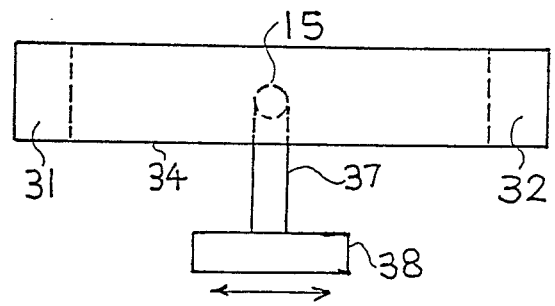
FIG. 13 is a schematic front view of the second embodiment of FIG. 12.

The second embodiment of the present invention is shown as a plan view in FIG. 12, and a front view in FIG. 13, and includes a closed magnetic circuit 36 having two yoke plates 33 and 34, two permanent magnets 31 and 32, a magnetic sensor 15, a supporting member 37 and a transferring base 38. Yokes 33 and 34 are made of magnetic material, such as an iron plate, having a thickness of 0.4 mm. As shown in FIG. 12, permanent magnets 31 and 32 are arranged between the two yokes 33 and 34, and the top surfaces of the poles of the two permanent magnets 31 and 32 are securely attached to the two yoke plates 33 and 34, respectively, at either end thereof. The directions of the pole axes of the permanent magnets 31 and 32 are selected to be opposite to each other. Thus, a closed magnetic circuit 36 is formed, wherein magnetic flux circulates and emanates from the N pole of the permanent magnet 31 through the yoke 33 and reaches the S pole of the permanent magnet 32. The flux then emanates again from the N pole of the permanent magnet 32 through the yoke 34, and returns to the S pole of the permanent magnet 31. At the same time, leakage flux emanates from the yoke 33 to the yoke 34 and vice versa depending on their position. With the aid of a transferring means, including supporting member 37 and transferring base 38, the magnetic sensor 15 is transferred along the inside surface of one of the yokes, i.e., yoke 33, in both directions (denoted by the two-arrow headed line), sensing the magnetic field intensity of the leakage flux therein.

Figure 14:
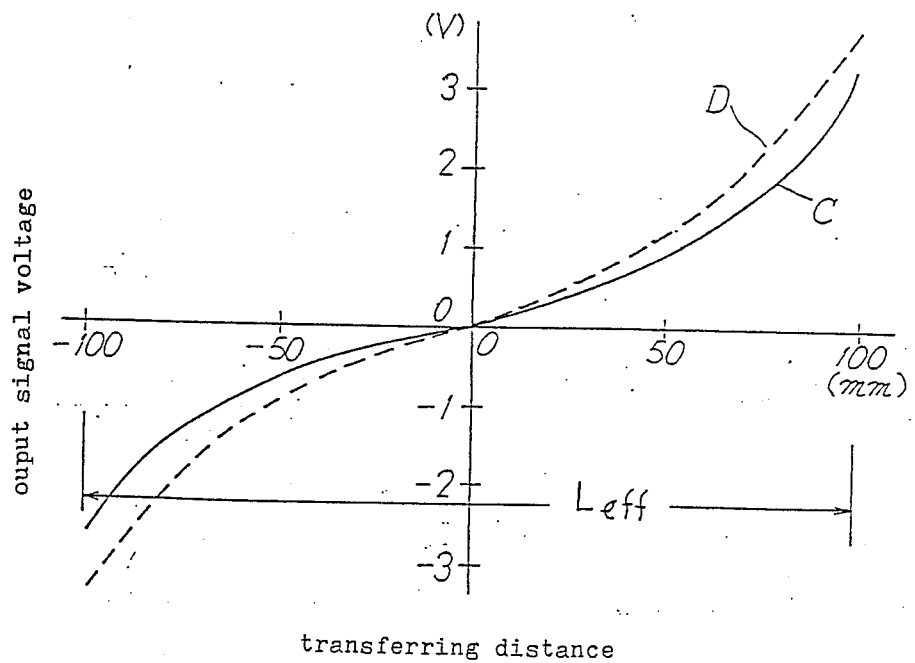
FIG. 14 is a graph of the output signal voltage obtained empirically, illustrating the magnetic intensity distribution of the second embodiment.

The output characteristic of the second embodiment is illustrated in FIG. 14. The coercive force of the permanent magnets 31 and 32 is selected to be between 1000 Oe and 1600 Oe and the distance therebetween is 260 mm. The output voltage V of the magnetic sensor 15 is amplified 100 times by an operational amplifier and is plotted along the ordinate. The transferring distance mm of the magnetic sensor 15 is plotted along the abscissa whose origin point corresponds to the midpoint between the two permanent magnets 31 and 32.

The solid curve C is an empirical result employing permanent magnets 31 and 32 having a coercive force of 1000 Oe, and the dotted curve D is for magnets having a coercive force of 1600 Oe. The length $L_{eff}$ is fairly longer than that of the prior art or the first embodiment, and is ±100 mm, e.g., 200 mm total. Apparently, permanent magnets having a higher coercive force serve to provide higher output voltages as shown by curve D.

Figure 15:
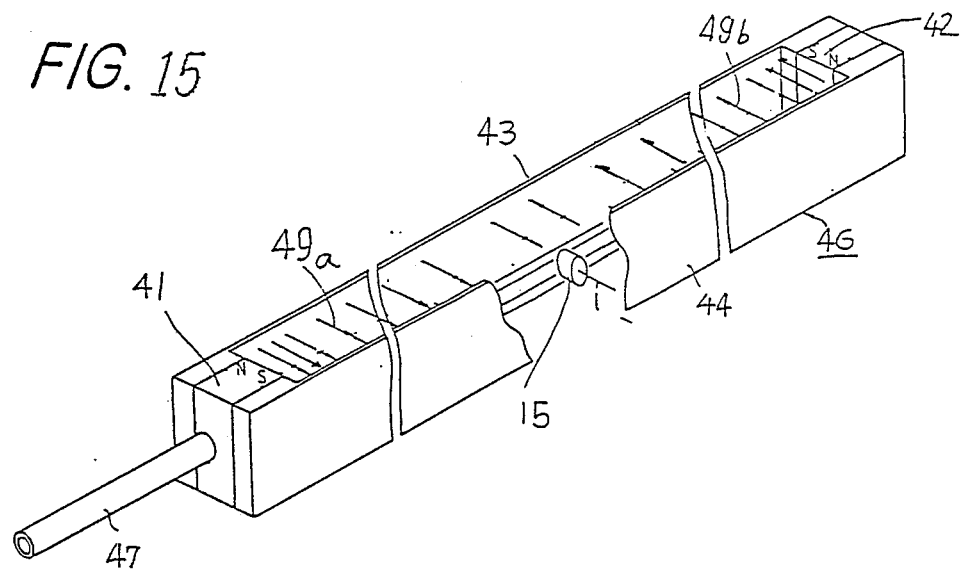
FIG. 15 is a perspective view of a third embodiment of the present invention having a slideable rod for transferring the magnetic sensor.
Figure 16:
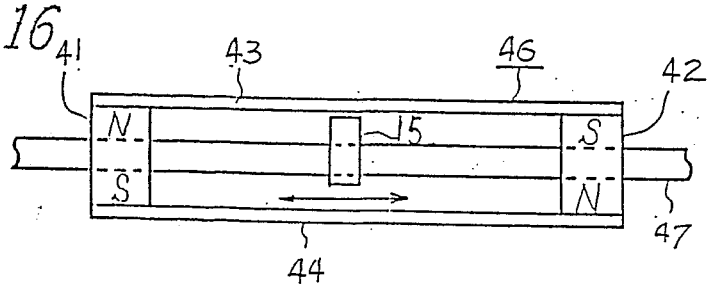
FIG. 16 is a schematic plan view of the third embodiment.

FIG. 15 is a perspective view of a third embodiment, and FIG. 16 is a plan view of the third embodiment. The third embodiment has a simplified transferring means compared to the second embodiment. The position detector of the third embodiment has a closed magnetic circuit 46 including permanent magnets 41 and 42, and yokes 43 and 44. Their mutual arrangement is the same as that of the second embodiment. A transferring rod 47, made of non-magnetic material, is slideable in its axial direction and is in parallel with the yokes 43 and 44. The magnetic sensor 15 is fixed to the rod 47 and carried thereby. The rod 47 is supported by holes in the permanent magnets 41 and 42, respectively, and is slideable therethrough. The rotating motion of the transferring rod 47 around its axis is strictly limited so that the plane of the magnetoresistive sensing element (not shown) of the magnetic sensor 15 is kept accurately in parallel with the leakage flux lines 49a or 49b for the reasons described above. To achieve this, a square cross-section of the rod 47 and the corresponding square holes opened in permanent magnets 41 and 42 may be employed, resulting in an expensive machining cost. However, the transferring function obtained is stable and reliable.

Figure 17:
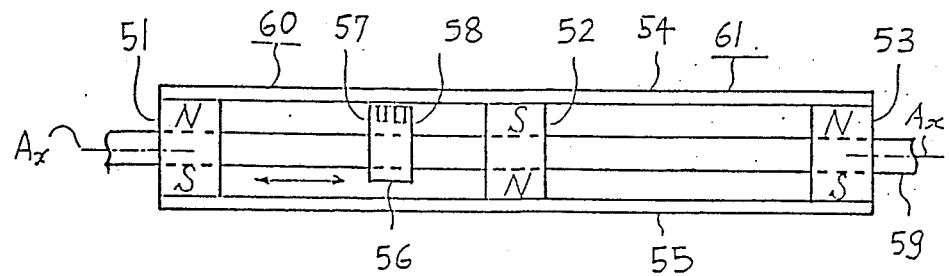
FIG. 17 is a schematic plan view of a fourth embodiment of the present invention having three permanent magnets forming two closed magnetic circuits connected in series.
Figure 18:
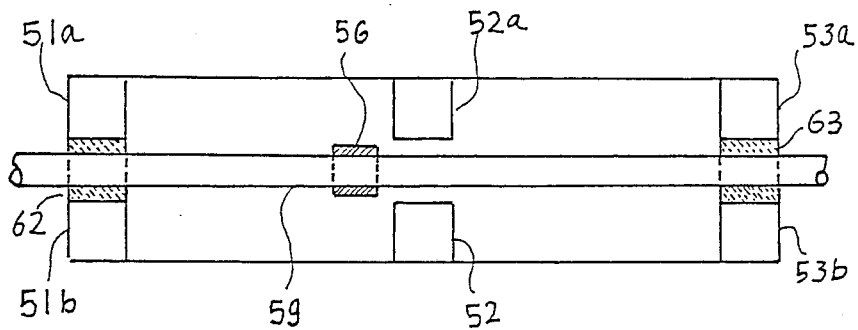
FIG. 18 is a schematic cross-sectional view of the fourth embodiment taken along the axis Ax of FIG. 17.
Figure 19:
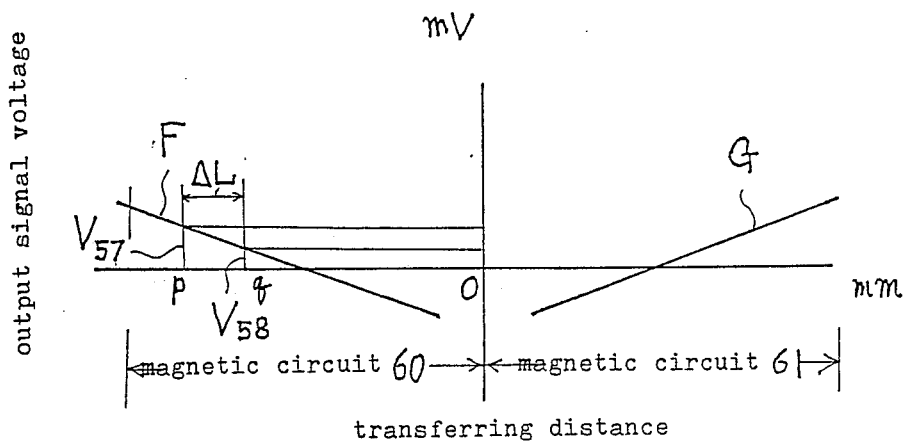
FIG. 19 is a graph of the output signal voltage obtained empirically, illustrating the magnetic intensity distribution of the fourth embodiment.

FIG. 17 and FIG. 18 are a plan view and a cross-sectional front view of the fourth embodiment of the present invention, respectively. The position detector has two closed magnetic circuits 60 and 61 connected in series with each other. The magnetic sensor 56 has a pair of magnetic sensing elements 57 and 58 formed of a magnetoresistive material, arranged in parallel with each other and having a small distance $\Delta L$ therebetween. Three permanent magnets 51, 52 and 53, are arranged between the yokes 54 and 55 which are made of magnetic material, such as iron plate, having a thickness of 0.4 mm and which form two closed magnetic circuits 60 and 61. The direction of the pole axis of each permanent magnet is perpendicular to the yokes 54 and 55, thus the closed magnetic circuits 60 and 61 are connected in series. In practice, the permanent magnet 51 is composed of two small permanent magnets 51a and 51b separated by a non-magnetic block such as a brass block 62 (shown by the hatched sections). The small permanent magnet 51a, the brass block 62 and another small permanent magnet 51b are adhered to each other to form one body. In the same manner, another permanent magnet 53 is composed of two small permanent magnets 53a and 53b, and a brass block 63 (shown by the hatched sections). The middle permanent magnet 52 is composed of two small magnets 52a and 52b, but has no brass block therebetween. An air space is kept between the two small permanent magnets 52a and 52b to allow the passage of the transferring magnetic sensor 56. Of course, the magnetic pole axis of the two small permanent magnets of each permanent magnet 51, 52 or 53 has the same direction. The transferring rod 59 is made of a non-magnetic material, is supported by brass blocks 62 and 63 having through holes therein, and is slidable in its axial direction. The magnetic sensor 56 is attached to the transferring rod 59 so that it moves along the inside surface of one of the two yokes and senses the magnetic leakage flux intensity. The signal voltage of the magnetic sensor 56 is output in the same manner as previously set forth, and its characteristic is plotted as shown in the graph of FIG. 19. In the graph, the distance along the transferring direction of the magnetic sensor 56 is plotted on the abscissa, whose origin is the center of the permanent magnet 52, and the output signal voltage mV is plotted on the ordinate. Curve F is the characteristic curve for the closed magnetic circuit 60 and curve G is the characteristic curve for the closed magnetic circuit 61, both being symmetrical with respect to the ordinate. Each curve shows characteristics similar to those of the second embodiment shown in FIG. 13.

The two magnetic sensors 57 and 58 in FIG. 17 are used for identifying in which closed magnetic circuit the magnetic sensor 56 is located. For example, the magnetic sensor 56 is assumed to be in the closed magnetic circuit 60, and the magnetic sensing element 57 and 58 are positioned at points corresponding to points p and q on the abscissa of the graph shown in FIG. 19. Apparently, the output signal voltage $V_{57}$ of the magnetic sensing element 57 is higher than the output signal voltage $V_{58}$ of the magnetic sensing element 58. The relationship $V_{57} > V_{58}$ is maintained as long as the magnetic sensor 56 is located in the closed magnetic circuit 60. It is apparent that this relationship is inverted in the closed magnetic circuit 61, becoming $V_{57} < V_{58}$. The output signal voltages of both magnetic sensing elements 57 and 58 are applied to a differential amplifier (not shown), whose positive or negative output voltage identifies in which closed magnetic circuit the magnetic sensor 56 is present. The output signal voltage of the magnetic sensor 56 can be obtained from one of the magnetic sensors 57 and 58, or the summation of both voltages can be provided, whereby the position indicated corresponds to the distance from the midpoint between both magnetic sensors 57 and 58. When each closed magnetic circuit 60 and 61 is formed according to FIG. 14, the total effective measuring distance $L_{eff}$ of the position detector becomes 400 mm.

The embodiments above have a linearly transferring magnetic sensor which is applicable to linear position detectors. Position detectors having magnetic sensors having a circular transferring path will now be described. These are applicable to the angular position detectors.

FIG. 20 is a perspective view of a fifth embodiment of the present invention, and FIG. 21 is an axial cross-sectional view taken along line A—A of FIG. 20. A closed magnetic circuit 74 includes a permanent magnet 71 and a U-shaped yoke 72 formed of magnetic material which is in a circular shape and is bent back at its end 73. At the end 73 the magnetic flux is turned back. The surfaces of the wall of the yoke 72 are perpendicular to the plane of the circle of the yoke 72, that is, for example, a double walled short cylinder having a small opening is formed. The end portion 73 of the yoke 72 provides a small space between the permanent magnet 71 which is inserted between the two branches of the yoke 72 and the other end of the yoke 72, as shown in FIG.

20. The magnetic flux 70 passing through the yoke 72 and the leakage flux 79 inside the closed magnetic circuit 74 are shown. The magnetic leakage flux outside the closed magnetic circuit 74 is not illustrated. A magnetic sensor 15 is supported by a support member 76 which is fixed to a rotating shaft 77 whose axis passes through the center of the circle of yoke 72, so that the magnetic sensor 15 can transfer inside the closed magnetic circuit 74 along the inside surface of the yoke 72. The support member 76 and the rotating shaft 77 are made of non-magnetic material such as brass. Thus, the leakage flux intensity of a given angular position of the circular closed magnetic circuit 74 or the circular yoke 72, can be sensed and the signal voltage can be output by the magnetic sensor 15. It should be noted that the transferring means for the magnetic sensor 15 is remarkably similar to those of the preceding embodiments. In addition, the magnetic leakage flux intensity distribution along the circular path of the magnetic sensor 15 is almost the same as that of the first embodiment shown in FIG. 10. A further description is omitted.

FIG. 22 is a perspective view of a sixth embodiment of the present invention, and FIG. 23 is an axial cross-sectional view taken along line A—A of FIG. 22. As shown in the figures, the sixth embodiment differs from the fifth embodiment only in that the surfaces of the circular yokes 82 of the sixth embodiment are in parallel with the plane in which the circular yoke 82 lies; whereas the yokes of the fifth embodiment are perpendicular to the plane in which the yoke 72 lies. The yoke 82 also has an end portion 83 at which the magnetic path is bent back. In other words, the circular yoke 82 looks like a pair of washers which are placed co-axially and in parallel with each other, having a space therebetween, and having an opening where both washers are connected to each other by the end portion 83. A permanent magnet 81, a magnetic sensor 15, a support member 86, and a rotating shaft 87 and the function of these elements is substantially the same as that of the fifth embodiment. As such, the function of the sixth embodiment will be easily understood by those skilled in the art without further explanation.

The second type of the embodiment of the present invention will now be described. As stated before, this type of position detector has a single yoke instead of a rail-road like double shaped yoke of the preceding embodiments. This allows a selection of a more arbitrary shape and a simpler structure than position detectors of the first type.

FIG. 24 is a perspective view of a seventh embodiment of the present invention. In this embodiment, an angular position detector has a circular closed magnetic circuit 94 composed of a circular yoke 92 made of magnetic material such as iron. A wedge-shaped permanent magnet 91 is inserted in a portion of circular yoke 92. The tapered portion of the permanent magnet 91 is directed to the inside of the ring of the yoke 92. This arrangement serves to improve the linearity of the angular characteristics of the output signal voltage. The associated magnetic sensor 15, support member 96 and rotating shaft 97 are similar to those of the fifth and sixth embodiments.

FIG. 25 is a schematic plan view of the seventh embodiment, illustrating the flux 90 circulating through the yoke 92, and the leakage flux 99 flowing across the inside surface of the wall of the yoke 92 and terminating at the opposite portion of the same. As can be seen in FIG. 25, the length of the path of each leakage flux line is different depending on the position from which the leakage flux emanates. Point $Q_3$ on the inside surface of circular yoke 92 is located at the center of the permanent magnet 91. The point $Q_3$ is taken as the origin (zero degrees), and the angular position is graduated: turning counterclockwise in the figure, $Q_4$ denotes 90 degrees, $Q_1$ denotes 180 degrees and $Q_2$ denotes 270 degrees. By sweeping the leakage flux field inside the closed magnetic circuit 94 using the magnetic sensor 15, the transferring means 96 and 97 sense the magnetic leakage flux field intensity therein. A characteristic curve of the relationship between the angular position and the output signal voltage of the magnetic sensor 5 is obtained as shown in FIG. 26. The available effective measuring range of the angular position is approximately 60 to 300 degrees. This range is fairly wide considering the effect of the varying path lengths of the leakage flux lines inside the closed magnetic circuit. In this case, the shape of the permanent magnet compensates the variation of the length of the paths of leakage flux, thereby improving the linearity of the measuring characteristics.

In the position detectors described above, the magnetic sensors are transferable and the closed magnetic circuit is fixed. However, these elements can be reversed, that is, the magnetic sensor can be fixed and the circular yoke together with the permanent magnet can rotate depending on the required conditions.

Regarding the angular position detectors described above, other combinations of yokes and permanent magnets, for example, linear position detectors can be employed. However, the basic combination is the same. Thus, further embodiments are not shown.

Figure 27:
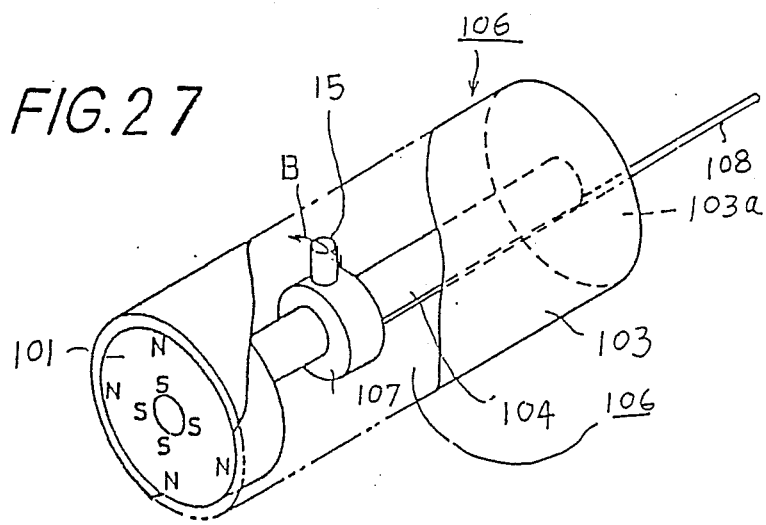
FIG. 27 is a schematic perspective view of an eighth embodiment according to the present invention having a permanent magnet, a cylindrical yoke and a rod yoke.
Figure 28:
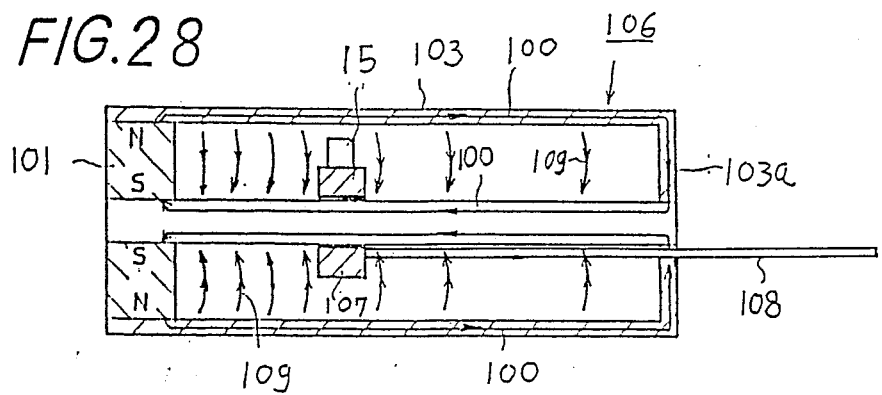
FIG. 28 is a schematic cross-sectional view of the eighth embodiment of FIG. 27 taken along the axis of the structure, illustrating the magnetic flux and leakage flux circulating therethrough.

The third type of position detector has a co-axial configuration and will now be described. FIG. 27 is a perspective view of an eighth embodiment of the present invention, and FIG. 28 is an axial cross-sectional view of FIG. 27. The position detector has a closed magnetic circuit 106 including a cylindrical yoke 103 having one end closed by a lid 103a, a rod yoke 104 and a permanent magnet ring 101. These three parts are arranged co-axially and are made of a magnetic material such as iron. The permanent magnet ring 101 is inserted into the yoke 103 and fixed tightly therein at an end opposite the lid 103a. The permanent magnet ring 101 has a coaxial hole therein to which the rod yoke 104 is inserted so as to closely contact each other. Thus, a closed magnetic circuit 106 is formed. As shown in FIG. 28, flux lines 100 exiting from the N pole (the outer portion of permanent magnet ring 101), circulate through the cylindrical yoke 103, lid 103a, and rod yoke 104 and return to the S pole (the inner portion of permanent magnet ring 101). On the way, leakage flux lines 109 emanating from the inner wall surface of the cylindrical yoke 103, travel radially, are substantially perpendicular to the rod yoke 104, and return to the S pole of the permanent magnet ring 101. The field intensity of the leakage flux distributed along the axis of the cylindrical yoke 103 is a maximum value near the permanent magnet ring 101 and decreases to a minimum value near the lid 103a. A magnetic sensor 15 is attached to a transferring ring 107 made of a non-magnetic material which has a co-axial hole so as to slideably fit over the rod yoke 104 in the axial direction. The means driving the transferring ring 107 in the axial direction is, for example, a thin rod 108 inserted from the outside and in parallel with the rod cylinder passing slideably through a hole opened in the lid 103a and attached to the transferring ring 107. Thus, the magnetic sensor 15 is transferred axially along the inside surface of the cylindrical yoke 103 by being pushed or pulled by the rod 108 which is closely connected to a body (not shown) to be detected. This mechanism may have various structures appropriate to drive the magnetic sensor 15, but is not the focus of the present invention, so further description thereof is omitted.

Figure 29:
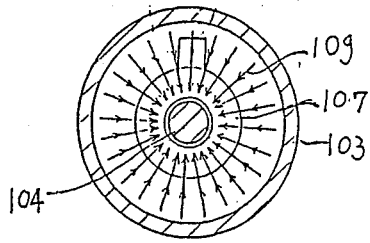
FIG. 29 is a schematic cross-sectional view taken perpendicular to the axis of the structure of the eighth embodiment of FIG. 27, illustrating the symmetrical distribution of the leakage flux lines.
Figure 30:
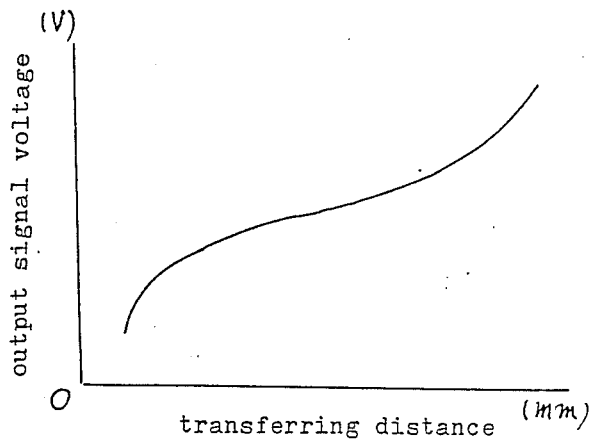
FIG. 30 is a graph of the output signal voltage characteristics of the eighth embodiment of FIG. 27.

FIG. 29 is a cross-sectional plan view of FIGS. 27 and 28, illustrating the leakage flux lines running radially inward which are symmetrical with respect to the center. As a result, the magnetic sensor 15 carrying a magnetoresistive sensing element such as barber-pole type element is allowed to rotate around the rod yoke with no effect on the output signal voltage. This embodiment favors easy machining and assembly of the position detector. This is an outstanding advantage in position detectors of the co-axial type. In addition, the inside of the closed magnetic circuit 106 is completely shielded from external magnetic disturbance, assuring a stable distance measurement. The relationship of the output signal voltage with respect to the transferring distance of the magnetic sensor 15 is shown in FIG. 30, which is quite similar to that of the first embodiment shown in FIG. 10.

Figure 31:
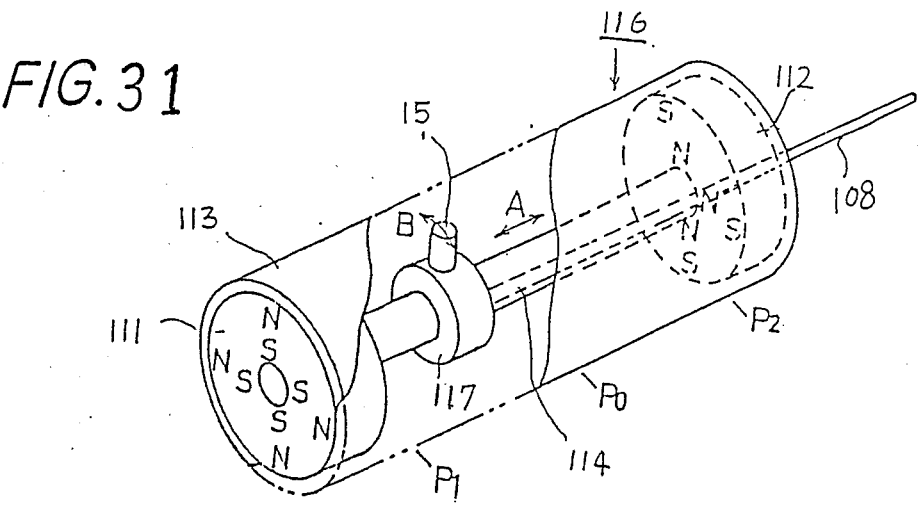
FIG. 31 is a schematic perspective view of a ninth embodiment according to the present invention having two permanent magnets, a cylindrical yoke, and a rod yoke.
Figure 32:
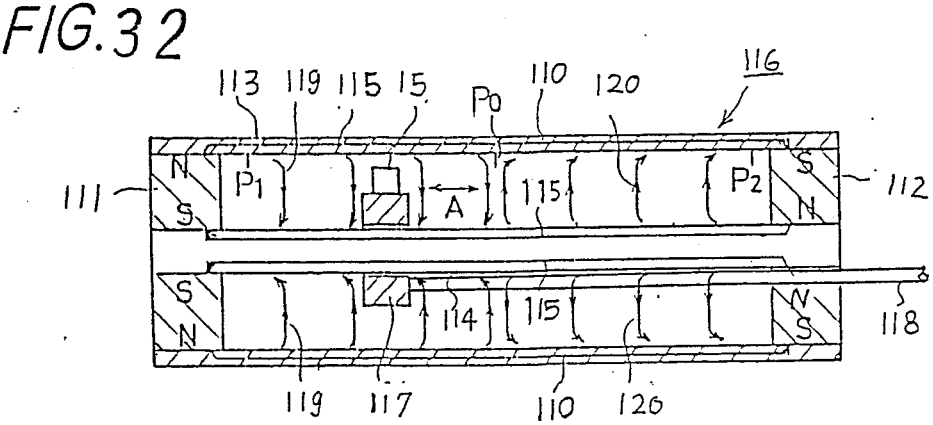
FIG. 32 is a schematic cross-sectional elevated view taken along the axis of the co-axial structure of the ninth embodiment, illustrating the magnetic flux and leakage flux circulating therethrough.
Figure 33:
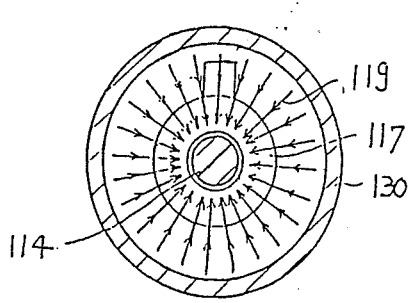
FIG. 33 is a schematic cross-sectional view taken perpendicular to the axis of the co-axial structure of the ninth embodiment, illustrating the symmetrical distribution of the leakage flux.

FIG. 31 is a perspective view of a ninth embodiment of the present invention having a co-axial structure and a pair of permanent magnet rings, and FIG. 32 is an axial cross-sectional view of FIG. 31. The position detector has a closed magnetic circuit 116 including a cylindrical yoke 113, a rod yoke 114 and a pair of permanent magnet rings 111 and 112. The yokes 113 and 114 are arranged co-axially and are made of a magnetic material such as iron. The permanent magnet rings 111 and 112 are inserted between the yoke 113 and the yoke 114 and are tightly fitted at both ends. The permanent magnet rings 111 and 112 each have a co-axial hole therein to which the rod yoke 114 is inserted. Both magnet rings 111 and 112 are magnetized in the radial direction thereof, and the magnetizing directions are opposite each other as shown in FIG. 32. Thus, a closed magnetic circuit 116 is formed. As shown in FIG. 32, flux lines 110 exit from the N pole (the outer portion of the permanent magnet ring 111), circulate through the cylindrical yoke 113, and return to the S pole (the outer portion of the permanent magnet ring 112). Then, magnetic flux lines 115 emanate from the N pole of the permanent magnet ring 112 (the inner portion of the magnet) circulate through the rod yoke 114 and return to the S pole of the permanent magnet ring 111 (the inner portion of the magnet). On the way, a portion of the leakage flux lines 119 emanate from the inner wall surface of the cylindrical yoke 113, travel radially and substantially perpendicular to the rod yoke 114, and return to the S pole of the permanent magnet ring 111. Another portion of the magnetic leakage flux 120 travels opposite that described above. This opposing direction of the leakage flux lines 119 and 120 depends on the directions of radial magnetization of the permanent magnet rings 111 and 112. A similar situation arose in the third embodiment shown in FIG. 16. The field intensity of the leakage flux along the axis of the cylinder is sensed by the magnetic sensor 15 which is attached to a transferring ring 117 made of a non-magnetic material. The ring 117 has a coaxial hole into which the rod yoke 114 is inserted in the axial direction. The means to drive the transferring ring 117 in the axial direction is a thin rod 118, for example, similar to that in the former embodiment. Thus, the magnetic sensor 15 is transferred along the inside surface of the cylindrical yoke 113 so as to sense leakage flux 119 and 120. The advantages of symmetrical magnetic leakage flux distribution and a magnetically shielded inside of the magnetic circuit are the same as these set forth in the eighth embodiment.

Figure 34:
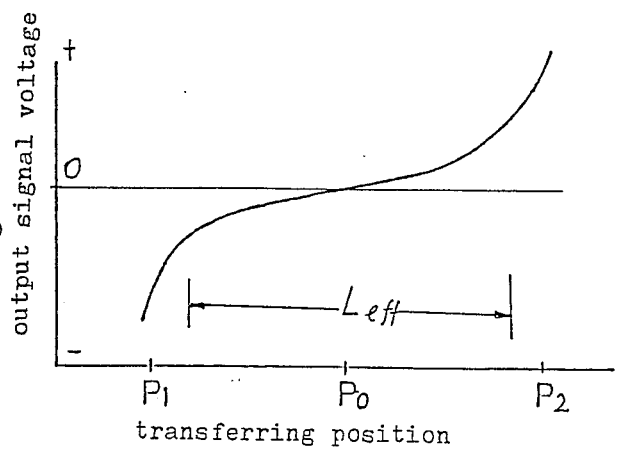
FIG. 34 is a graph of the output signal voltage characteristics of the ninth embodiment of FIG. 31.

The output signal voltage of the magnetic sensor 15 is plotted against the position of the magnetic sensor 15 as shown in FIG. 34. The characteristics of the curve in FIG. 34 are also quite similar to those shown in FIG. 14 of the second embodiment. The positions $P_0$, $P_1$, and $P_2$, indicated in FIG. 31 correspond to the points on the abscissa in FIG. 34 designated by the same letters, respectively. The signal voltage has an opposite polarity at both ends and becomes zero at the middle point between the permanent magnet rings 111 and 112, that is, at point $P_0$ in FIG. 31. The available measuring range $L_{eff}$ designated in FIG. 34 is approximately 200 mm.

Figure 35:
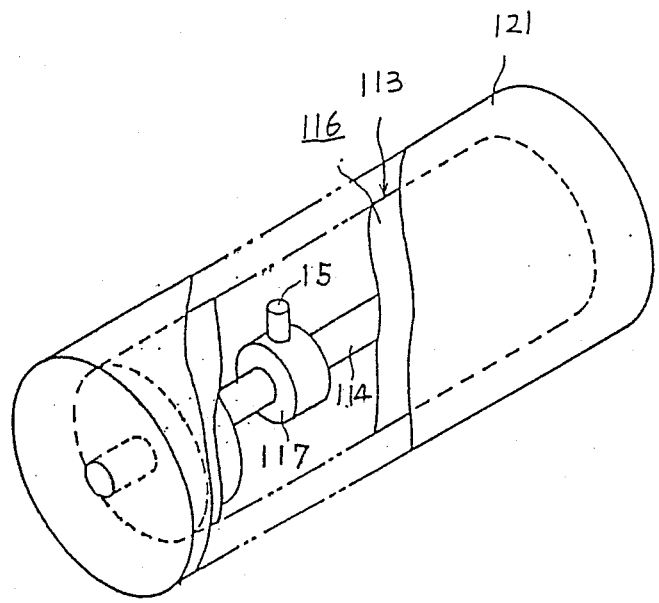
FIG. 35 is a schematic perspective view of a tenth embodiment having a magnetic shielding member.
Figure 36:
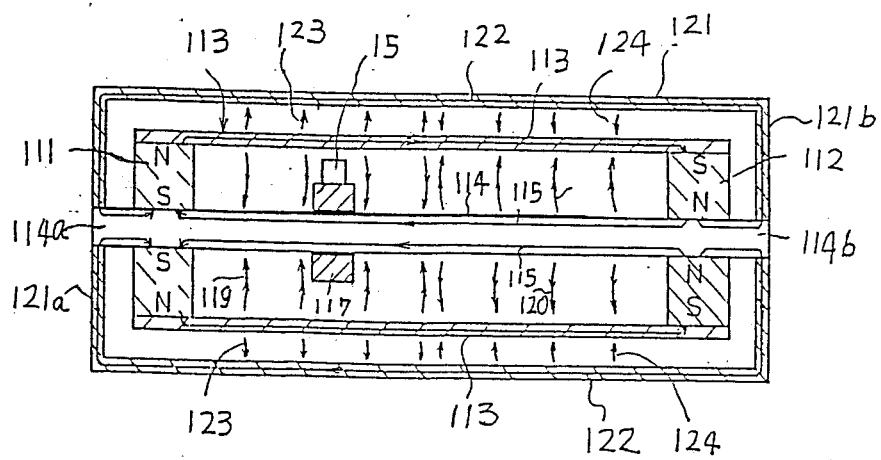
FIG. 36 is a schematic elevated cross-sectional view of the tenth embodiment of FIG. 35, illustrating the magnetic flux and leakage flux circulating therethrough.

A tenth embodiment of the present invention is shown as a perspective view of FIG. 35 and a cross-sectional elevated view of FIG. 36. The co-axial position detector of the tenth embodiment is improved over that of the ninth embodiment in that it has a magnetic shielding means. The description regarding the position detector, except for the added shielding means, is omitted for simplicity. In the ninth and tenth embodiments, like reference numerals are used to denote like parts. The rod yoke 114 is extended in both directions over both permanent magnet rings 111 and 112, forming projected portions 114a and 114b of the rod yoke, respectively. A shielding cylinder 121 is made of a magnetic material and has lids 121a and 121b each having a hole in the center. The shielding cylinder 121 contacts the projected portions 114a and 114b since they are inserted into the holes in the lids 121a and 121b, respectively. The magnetic flux lines 122 run through the shielding cylinder 121 and the leakage flux lines 123 and 124 run across the space between the shielding cylinder 121 and the cylindrical yoke 113. The entire position detector is protected from external magnetic disturbance by the shielding effect provided by the shielding cylinder 121. Therefore, an enhanced stability and accuracy of measurement is obtained. A cylindrical shielding means is described, however, the outer shape of the shielding means is not limited to a cylindrical shape. Any other shape, for example, a square shape, may be used, as long as the shielding means magnetically encloses the position detector.

Various improvements of a position detector according to the present invention will be described. These improvements concern improving the linearity of the output signal voltage with respect to the transferring distance by using an electromagnet instead of a permanent magnet, enhancing the emanation of leakage flux from the inside surface of a yoke by a specially formed inside surface, avoiding the effect of the temperature drift of the relevant magnetic sensor, and providing a magnetic sensor having hysteresis characteristics. These improvements are applicable to the embodiments which have already been described.

Generally, when magnetic flux has a path which passes through magnetic material, leakage flux emanates from the surface of the magnetic path, and the leakage flux decreases with the permeance of the magnetic path. Utilizing this phenomena, the cross-sectional area of the yoke members perpendicular to the longitudinal direction are varied with the longitudinal length so as to emanate leakage flux lines having a linear intensity distribution in the same direction.

Figure 37:
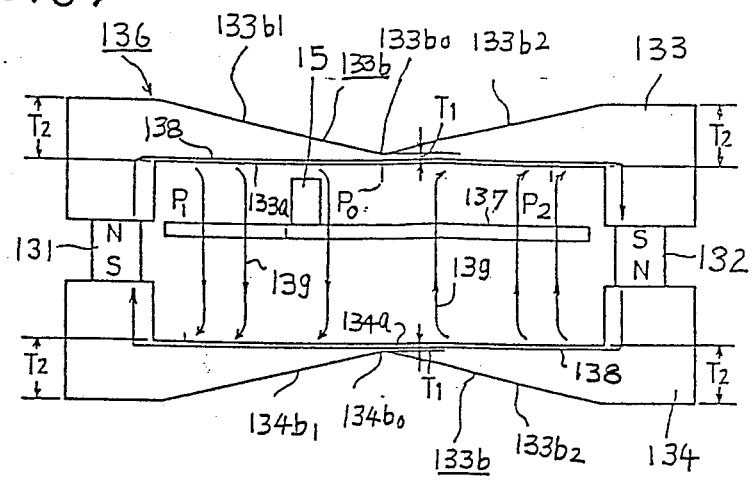
FIG. 37 is a schematic plan view of an eleventh embodiment according to the present invention having yokes with V-shaped outside surfaces and associated magnetic flux lines.
Figure 38:
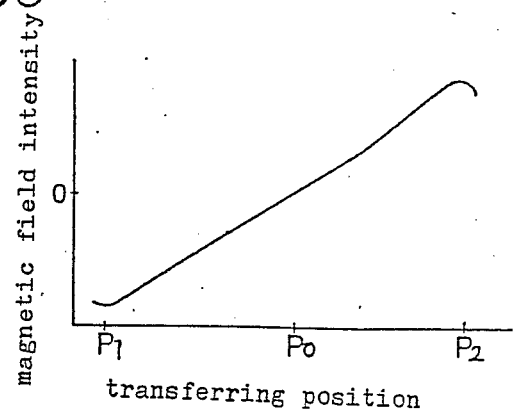
FIG. 38 is a graph of the distribution of the magnetic leakage flux intensity along the yoke in the longitudinal direction in the eleventh embodiment of FIG. 37.
Figure 39:
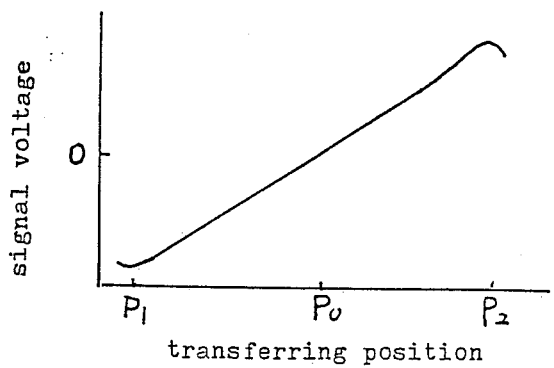
FIG. 39 is a graph of the output signal voltage distribution along the yoke in the longitudinal direction of the eleventh embodiment.

FIG. 37 is a schematic plan view of an eleventh embodiment of the present invention, showing a position detector and the associated magnetic flux lines. The position detector of this embodiment has a closed magnetic circuit 136 including two permanent magnets 131 and 132, two yokes 133 and 134, and a magnetic sensor 15 carried by a transferring means 137. The inside surfaces 133a and 134a of the yokes 133 and 134 are flat planes which are parallel with each other. The surfaces opposite the respective inside surfaces 133a and 134a, that is, the outside surfaces 133b and 134b, are concave and are connected to two inclined flat surfaces $133b_1$ and $133b_2$, or $134b_1$ and $134b_2$ and descend toward center portions $133b_0$ or $134b_0$ as shown in FIG. 37. The outside surfaces 133b and 134b have bottoms $133b_0$ and $134b_0$, respectively, located at a center position $P_0$ and have peaks at ends $P_1$ and $P_2$. The thickness of the yoke is at a minimum $T_1$ at the center $P_0$ and is at a maximum $T_2$ at the ends $P_1$ and $P_2$. The ratio $T_2/T_1$ is selected to be in a range from 2.0 to 5.0. The magnetic flux emanating from the permanent magnets 131 and 132 circulates through the closed magnetic circuit 136 in the same manner as in the second embodiment. The width of both yokes 133 and 134 is constant. Thus, the magnetic permeance of the yokes 133 and 134 in their longitudinal direction decreases gradually from their ends toward their center portion. Therefore, the magnetic leakage flux lines 139 emanating from the inside surfaces 133a and 134a are gradually enhanced from the ends $P_1$ and $P_2$ toward the center portion $P_0$, which is an advantage over a position detector having level outside surfaces 133b and 134b as shown in FIG. 12. As a result, the position detector of the eleventh embodiment has a more linear distribution of the magnetic leakage flux intensity than that of the second embodiment, as shown in FIG. 38, leading to more linear characteristics of the output signal voltage with respect to the transferring distance as shown in FIG. 39, than that of the second embodiment shown in FIG. 14.

Figure 40:
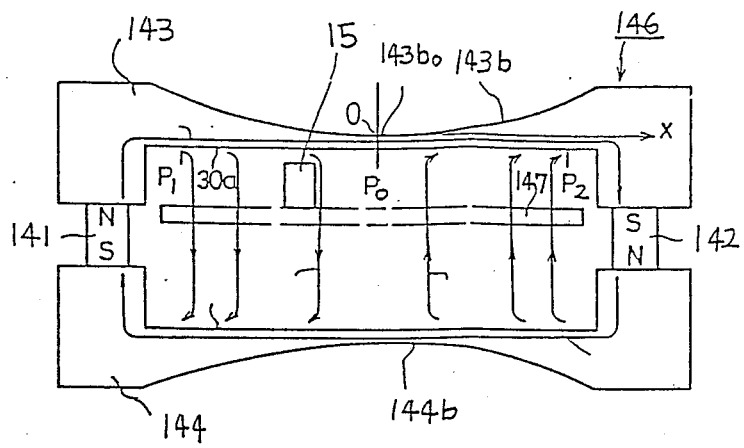
FIG. 40 is a schematic plan view of a twelfth embodiment according to the present invention having yokes with concave outside surfaces and associated magnetic leakage flux lines.
Figure 41:
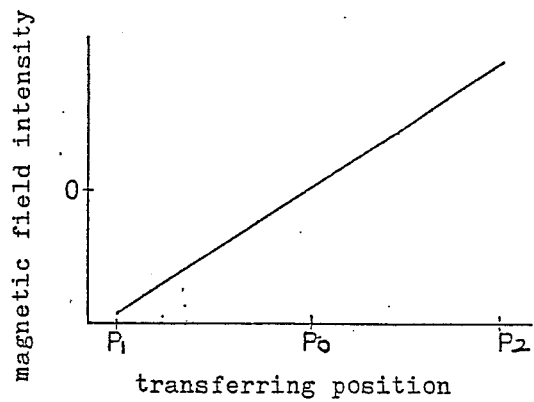
FIG. 41 is a graph of the magnetic leakage flux intensity distribution along the yoke in the longitudinal direction of the twelfth embodiment.

FIG. 40 is a schematic plan view of a twelfth embodiment of the present invention, having a configuration similar to that shown in FIG. 37 except for the shape of the concave outside surface of the yokes. The description of the portions of FIG. 40 which are the same as the eleventh embodiment (FIG. 37) is omitted for simplicity. The inside surfaces 143a and 143b of respective yokes 143 and 144 are flat and are arranged in parallel with each other. The concave outside surface 143b is a curved surface represented by the formula, $Y = \pm k X^{3/2}$ whereby k is a constant, the origin is taken as the center $P_0$ of the outside surface 143b, X is the length measured along the longitudinal direction of the yoke 143, and Y is the thickness of the yoke 143 measured perpendicular to the longitudinal direction. The other concave outside surface 144b is represented by the same formula. The leakage flux density distribution and output signal voltage with respect to the transferring distance characteristic of the magnetic sensor are shown, respectively, in FIG. 41 and FIG. 42. The embodiment in FIG. 40 has more linear characteristics than those of the eleventh embodiment shown in FIG. 38 and FIG. 39.

Hereto, a permanent magnet has been employed as a magnetic field generating means. However, an electromagnet is also applicable to a position detector of the present invention. There are two advantages to using an electromagnet instead of a permanent magnet: one being that the external magnetic hazard can be avoided; and the other being that a wider freedom of design, particularly with respect to that of the relevant transferring means, is available.

Figure 43:
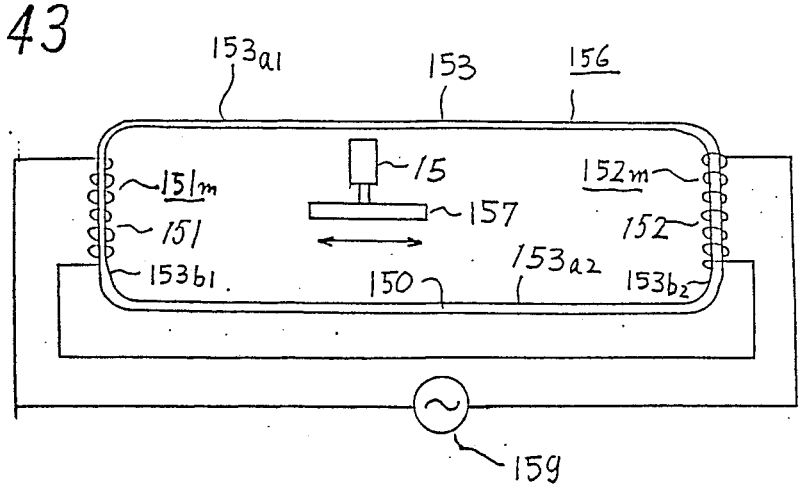
FIG. 43 is a schematic plan view of a thirteenth embodiment according to the present invention having a pair of electromagnets.

FIG. 43 is a plan view of a thirteenth embodiment of the present invention, having a closed magnetic circuit 156 including a long rectangular ring yoke 153 whose two long sides $153_{a1}$ and $153_{a2}$ are in parallel. Two exciting coils 151 and 152 are connected in series and wound around both short sides $153_{b1}$ and $153_{b2}$ of the yoke 153 in a direction opposite from each other. The coils are made of a magnetic material. As a result, the electromagnets 151m and 152m have opposite magnetizing directions. An alternating power supply 159 having a predetermined frequency is provided to supply the electromagnets 151m and 152m with an alternating exciting current, causing an alternating magnetic flux 150 to circulate through the yoke 153. Like the position detector of the second embodiment in FIG. 12, alternating magnetic leakage flux (not shown) emanates from the inside surface of the yoke 153 and is sensed by a magnetic sensor 15 transferring along the inside surface by the aid of the transferring means 157.

Figure 44:
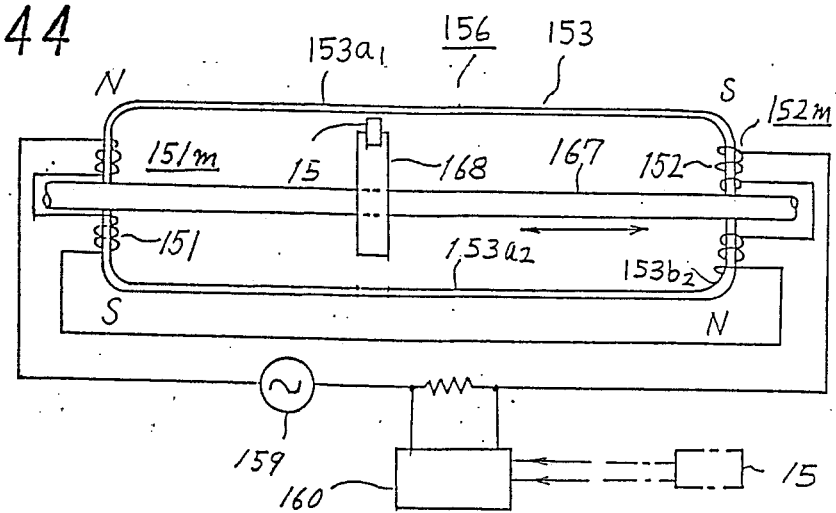
FIG. 44 is a plan view of a fourteenth embodiment having a coil exciting circuit.

FIG. 44 is a plan view of a fourteenth embodiment of the present invention. A rectangular yoke ring 153 is made from an iron plate and has a width extending in a perpendicular direction to the paper. The transferring means comprises a rod 167 and a support 168 made of a non-magnetic material, slideable in the longitudinal direction of the ring yoke 153 and supported by holes in the ring yoke 153. A magnetic sensor 15 is attached to the slideable rod 167 through the support 168. The magnetic sensor 15 is transferred in both directions indicated by the double-headed arrow. The end of the slideable rod contacts a body whose position is to be detected and moves with the body. Thus, the position of the body of interest is detected. The output signal voltage of the magnetic sensor 15 (shown by a dotted rectangular line) is read out through a lock-in amplifier 160 in which the voltage drops through a resistor R connected in series with coils 151 and 152. Only the components of the output signal voltage of the magnetic sensor 15 having the same frequency, such as 12 KHz, as that of the power supply 159 are output as position information. Therefore, the external magnetic noises, except those having the same frequency as that of alternating power supply 159, are filtered out.

Figure 42:
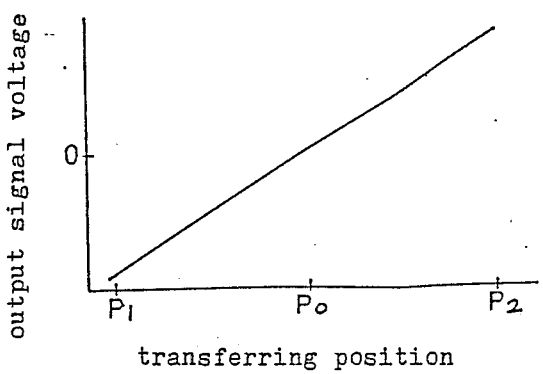
FIG. 42 is a graph of the output signal voltage characteristic along the yoke in the longitudinal direction of the twelfth embodiment of FIG. 40.
Figure 45:
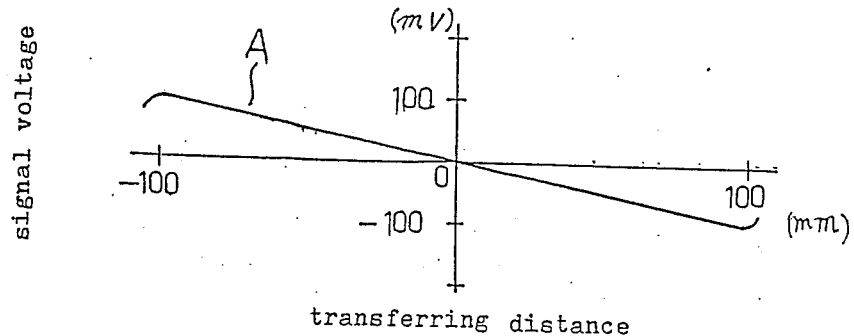
FIG. 45 is a graph of the output signal voltage versus transferring characteristic of the position detector of the fourteenth embodiment of FIG. 44.

FIG. 45 is a graph of the signal voltage with respect to the transferring distance characteristics of a position detector as shown in FIGS. 42 and 43 in which the measuring range is ±100 mm.

The machinability of the yoke ring 153 is much higher than that of a conventional permanent magnet, and the design of position detectors using electromagnets can be selected more freely than that of position detectors using permanent magnets. Consequently, the design of a position detector using electromagnets, (and particularly the design of the transferring means of the magnetic sensor), becomes much more flexible than when using permanent magnets.

In addition, when a position detector having electromagnets is used in a high temperature environment such as in an engine of a car, the position detector is stable without having to employ any compensating means. In contrast, permanent magnets are not stable and require some type of compensation.

Another characteristic of magnets is that a projection having a sharp pointed summit formed on a surface of a magnetic material tends to emanate more leakage flux than that of a flat surface. Utilizing this phenomena, a grooved surface of the inside surface of a yoke is proposed as a fifteenth embodiment of the present invention. These projections enhance the leakage flux therefrom, serving to reduce the magnetomotive force required to obtain a sufficient output signal voltage from a magnetic sensor of the associated position detector. For example, a yoke having an inside surface with a great number of stripped projections thereon, a height of 5 μm, a width of 20 μm, and a pitch of 40 μm, as shown in a magnified partial cross-sectional view in FIG. 46, enhances the leakage flux density. Of course, other shapes of projections such as saw-shaped stripes, notched grains, etc., are applicable. These projections can be formed by a mechanical method, a physical or chemical deposition method, a powder sintering method, etc.

The next improvement is concerned with compensating the drift of the relevant magnetic sensor of a position detector due to external conditions such as external disturbance and environmental temperature. In a linear position detector such as described in the second or third embodiments two permanent magnets are employed having characteristics ranging from a minus signal voltage to a plus signal voltage as shown in FIG. 14. There is a point of zero signal voltage (referred to hereinafter as a zero point) which is an important point often utilized as a standard point to detect an absolute position of a body.

In an amplifier, offset sometimes occurs which is generally caused by the change of bias resistors, transistor characteristics, etc., causing the zero point of the position detector to drift. This results in erroneous position detection.

FIG. 47 is a cross-sectional plan view of a sixteenth embodiment having a closed magnetic circuit 176 composed of a pair of permanent magnets 171 and 172, and two yokes 173 and 174 arranged in the same manner as the third embodiment. A rod 177 formed of a non-magnetic material is supported by and slideable through holes in the permanent magnets 171 and 172. A magnetic sensor 175 is attached to rod 177, and has two magnetic sensing elements 178 and 179, both having a sensing polarity similar to that of a barber-pole type magnetoresistive element which was described before. As the magnetic sensor 175 is transferred in the longitudinal direction of the yokes 173 and 174, the magnetic sensing elements 178 and 179 are also transferred along the inside surfaces of the yokes 173 and 174, and sense magnetic leakage flux. Both magnetic sensing elements 178 and 179 are equipped so that the directions of sensing polarity are opposite to each other. Consequently, the polarity of the output signal voltages of both magnetic sensing elements 178 and 179 are also reversed.

FIG. 48 is a graph of the output signal voltage with respect to the transferring distance characteristics of the position detector in FIG. 47. The final output signal is the difference between the output signals of the individual magnetic sensing elements 178 and 179 which are shown by the descending curve J and the ascending curve K which cross each other at a zero point a. When the position detector is subject to an external offset, both curves J and K shift upward by the same signal voltage value as represented by curves J' and K', which have a crossing point a'. The curve J' and K' are in the same location and position. As a result, the final output signal voltage of the position detector, which is the difference between the output signal voltages represented by the curves J' and K', respectively, remains unchanged. In particular, the position of the crossing point, a and a', i.e., the zero point, is fixed at the same position as before.

When the environmental temperature is raised, saturated magnetic flux density of the relevant permanent magnets tends to decrease, resulting in a weakening of the magnetic leakage flux intensity, causing a reduction in the output signal voltage of the magnetic sensor. Consequently, the sensitivity of the position detector, which is proportional to the slope of the characteristic curve, decreases. In order to compensate the decrease in the sensitivity, a seventeenth embodiment of the present invention is proposed and shown in a cross-sectional view of FIG. 49.

The magnetic sensor 185 of the position detector of the seventeenth embodiment has a pair of parallel magnetic sensing elements 180 and 181 having a space $\Delta L$ therebetween. The magnetic sensing elements 180 and 181 are equipped for detecting the slope of the characteristic curve described above for cases with and without an external disturbance such as a temperature rise. An output signal voltage affected by an external disturbance is corrected by employing a microprocessor (not shown).

Figure 50:
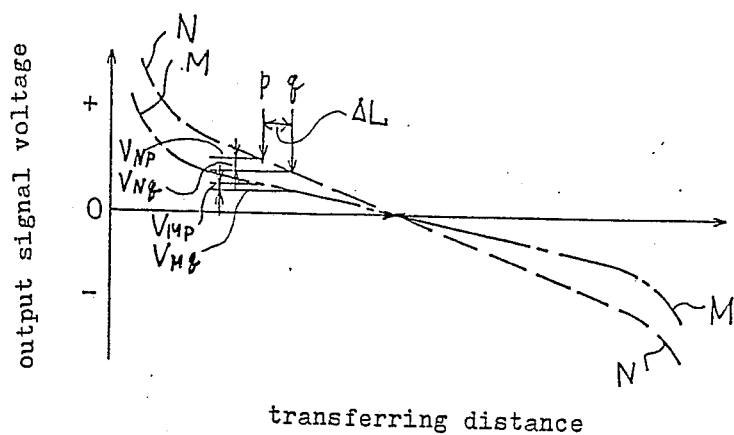
FIG. 50 is a graph of an output signal voltage versus transferring distance characteristic of the seventeenth embodiment of FIG. 49.

FIG. 50 is a graph of the characteristics of the seventeenth embodiment. A curve N represents the characteristics in a normal environmental temperature, and a curve M represents the characteristics in an elevated temperature. Assuming the magnetic sensing elements 180 and 181 are located at points p and q of the transferring path which are spaced apart by the distance $\Delta L$, and the output signal voltages from the magnetic sensing elements 180 and 181 are $V_{Np}$ and $V_{Nq}$, the slope of the curve N is determined as $(V_{Np}-V_{Nq})/\Delta L$. In the same manner, the slope of the curve M is $(V_{Mp}-V_{Mq})/\Delta L$. The output signal voltage $V_M$ of curve M, i.e., the output signal voltage from the magnetic sensor 185 at an elevated temperature is corrected to an output voltage at a normal temperature by multiplying the values by $\alpha$, where $$\alpha=(V_{Np}-V_{Nq})/(V_{Mp}-V_{Mq})$$

This correction factor is calculated by a microprocessor (not shown).

In the seventeenth embodiment of FIG. 49, the zero point of the position detector is easily detected. Both magnetic sensing elements 180 and 181 are at a distance from each other, so the output signal voltages therefrom are always different from each other except where the zero point is at the midpoint between both magnetic sensing elements. The differential output signal voltage from the magnetic sensing elements 180 and 181 is checked by, for example, a differential amplifier and the zero value indicates that the zero point is located at the midpoint between both magnetic sensing elements 180 and 181.

A position detector combining the preceding two embodiments of FIGS. 47 and 49 can be realized. This is easily accomplished by one of skill in the art, so further description thereof is omitted for simplicity.

The last improvement according to the present invention is concerned with a magnetic sensor which has hysteresis characteristics. One example of a need for such a magnetic sensor will be described briefly. Assuming a position detector is used for sensing or detecting the liquid surface level in a tank, for example, a fuel tank installed in a car. A linear position detector such as the third embodiment of the present invention shown in FIG. 15 is used in connection with a float on the surface of a liquid. In the case where the level of the liquid is always disturbed by an external mechanical disturbance, such as vibration and pumping action, the float is always going up and down, frequently and suddenly changing its direction. A pump attached to the tank for adjusting the liquid level at a predetermined height is controlled by the output signal from the position detector. As such, the pump is frequently switched on and off, causing a short lived problem of the pump and the associated devices. For overcoming this chattering problem, a position detector, which is sensitive to one transferring direction of its magnetic sensor and is unresponsive to the opposite direction, is proposed in an eighteenth embodiment of the present invention. The position detector of the eighteenth embodiment has a magnetic sensor which has hysteresis characteristics. The details will now be described.

Figure 51:
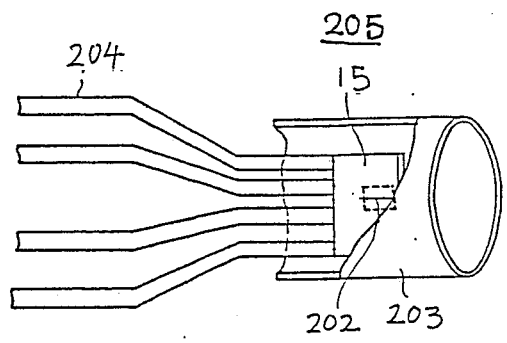
FIG. 51 is a partial perspective view of the magnetic sensor having a magnetic enclosure according to an eighteenth embodiment of the present invention.

FIG. 51 is a perspective view of a magnetic sensor 205 employed in the position detector of the eighteenth embodiment. The magnetic sensor 205 has hysteresis characteristics. The position detector of the eighteenth embodiment is assumed to be the same as that of the third embodiment shown in FIG. 15, for example. The eighteenth embodiment is applicable to all the other preceding embodiments except the third embodiment.

Figure 1:
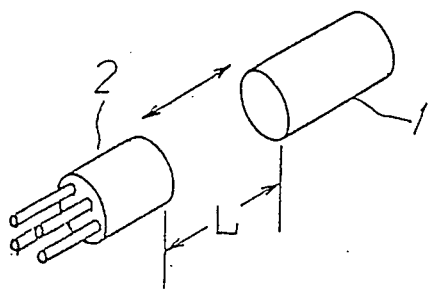
FIG. 1 is a perspective view of a prior art position detector.
Figure 2:
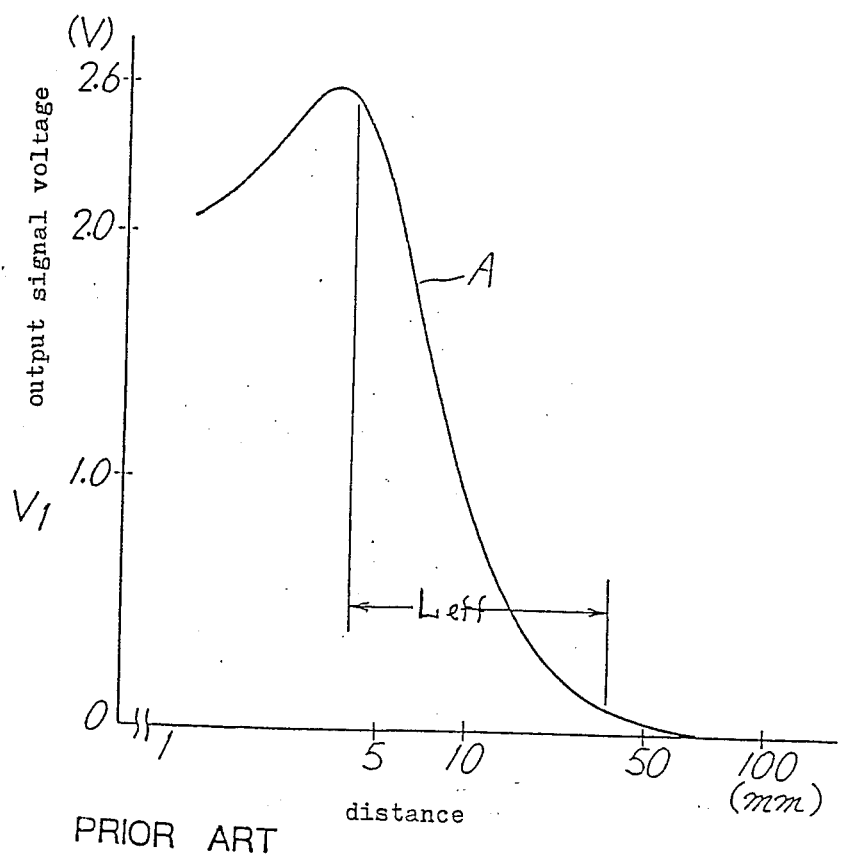
FIG. 2 is a graph of the relationship between the distance L and the output voltage of the magnetic sensor 2 in FIG. 1.
Figure 3:
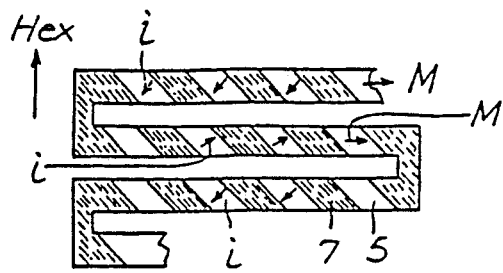
FIG. 3 is a partial plan view of the magnetic sensing element of FIG. 1.
Figure 5:
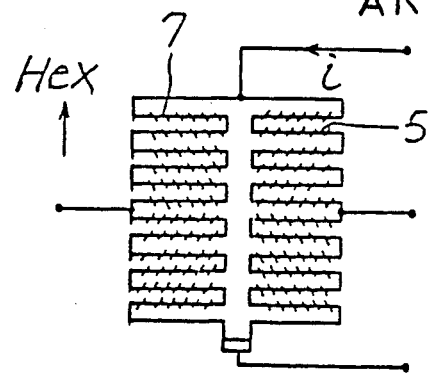
FIG. 5 is a wiring diagram of four barber-pole type magnetic sensing elements connected as the four arms of a Wheatstone bridge.
Figure 4:
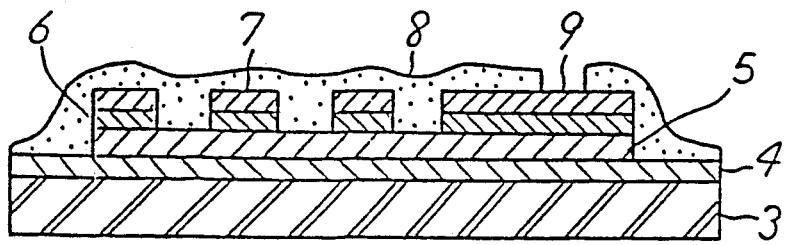
FIG. 4 is a schematic cross-sectional view of the magnetic sensor of FIG. 1.
Figure 6:
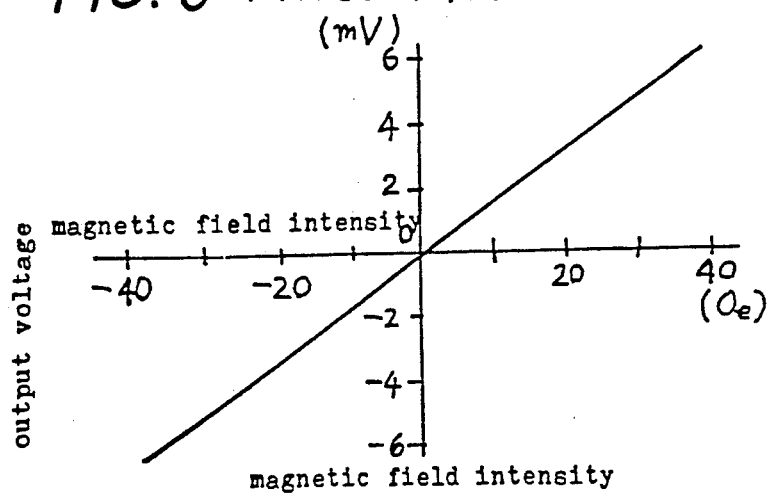
FIG. 6 is a graph of the barber-pole type magnetic sensor of FIGS. 3, 4 and 5.

As shown in FIG. 51, the magnetic sensor 205 contains a magnetic sensing element 202 (shown by dotted lines), made of a magnetoresistive film. The element 202 has linear output signal voltage and external magnetic field characteristics as shown in FIG. 6. A magnetic enclosure 203, made of a ferromagnetic metal, such a Permalloy, silicon steel, etc., encloses the magnetic sensing element 202 and substantially magnetically shields the elements. The parts of the magnetic sensor 205 are arranged so that the axis of the magnetic enclosure 203 coincides with the magnetizing direction of the element 202. Further, the axis of magnetization of the magnetic enclosure 203 is also selected to coincide with the axis thereof by the associated heat treatment. The magnetic sensor 205 also has lead terminals 204 for transmitting the output signal voltage from the element 202 to a subsequent amplifier.

Figure 52:
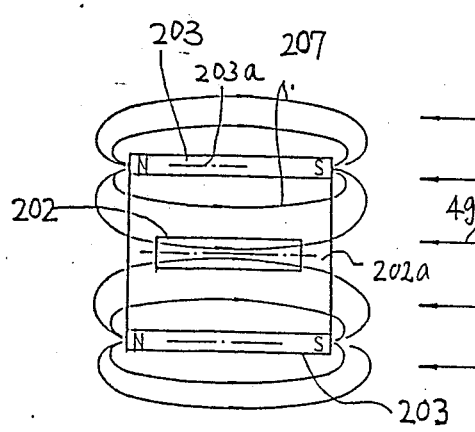
FIGS. 52 and 53 are magnified cross-sectional plan views of the magnetic sensor of the eighteenth embodiment of FIG. 51, illustrating the configuration of magnetic fields of the magnetic sensor.
Figure 53:
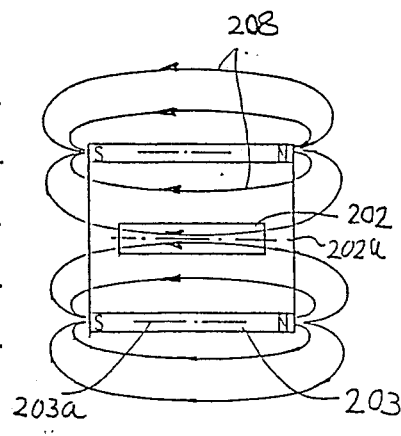

When an external magnetic field (i.e., the leakage flux 49a or 49b as shown in FIG. 15), is applied to the magnetic sensor 205, the magnetic enclosure 203 is magnetized generating leakage flux lines 207 or 208 which are applied to the magnetic sensing element 202. The magnetic field configuration is illustrated in FIG. 52 and FIG. 53. Thus, the magnetic field intensity due to the leakage flux 207 is applied to the magnetic sensing element 202 when the magnetic sensor 205 is located in the left portion of the closed magnetic circuit 46 of the position detector of FIG. 15, and the magnetic field intensity due to the leakage flux 208 is applied to the magnetic sensing element 202 when the magnetic sensor 205 is located in the right portion of the closed magnetic circuit 46 of the position detector of FIG. 15.

Figure 54:
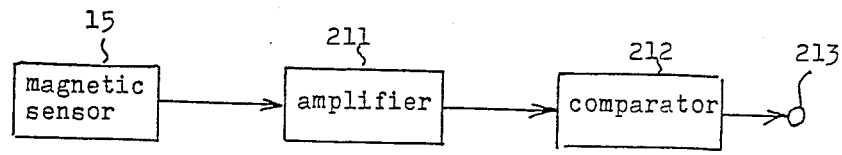
FIG. 54 is a block diagram of a circuit necessary to operate the position detector of the eighteenth embodiment of FIG. 51 as a switching means.

FIG. 54 is a block diagram of a circuit used with the position detector of the eighteenth embodiment. The output signal voltage from the position detector is amplified by an amplifier 211 and the output voltage is compared with a predetermined reference voltage $V_r$ in a comparator 212 and used as a switching signal for a pumping system of a liquid pump.

Figure 55:
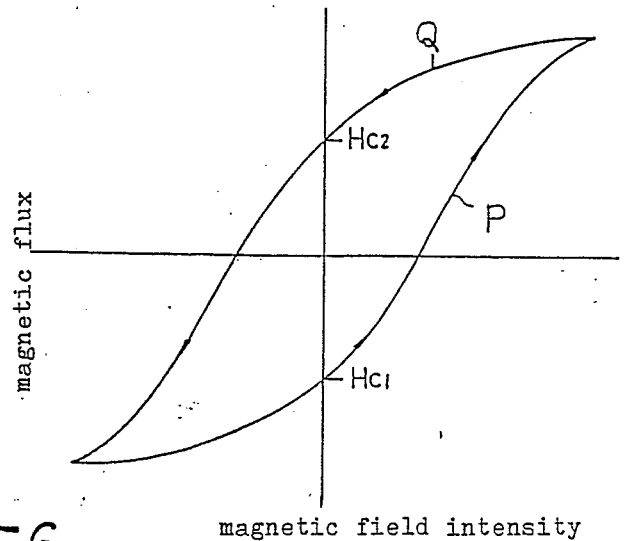
FIG. 55 is a graph of the magnetic characteristic of magnetic material used for a magnetic enclosure for a magnetic sensor according to the eighteenth embodiment of FIG. 51.
Figure 56:
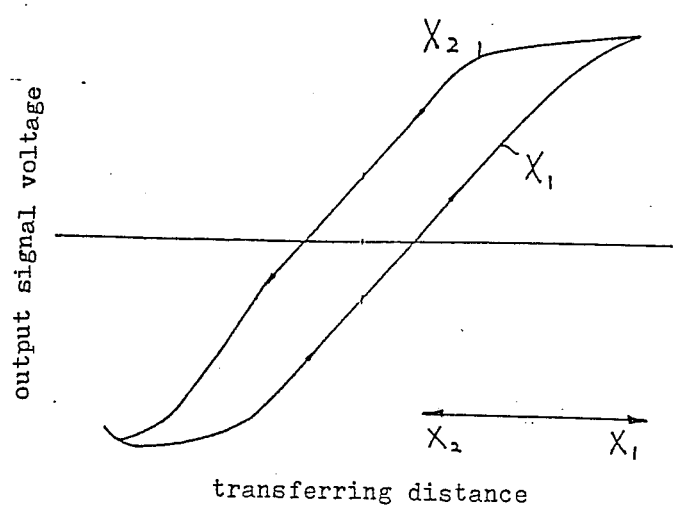
FIG. 56 is a graph of the magnetic characteristic of the hysteresis characteristic of a magnetic sensor according to the eighteenth embodiment of FIG. 51.

Ferro-magnetic magnetic metal is used for the magnetic enclosure 203 which has the magnetic characteristics shown by curves P and Q of FIG. 55. Due to the hysteresis characteristics, the magnetic coercive force or magnetic flux density of the magnetic enclosure 203 differs greatly depending on whether the applied magnetic field intensity of the leakage flux 49a or 49b is increasing or decreasing with time. Referring to FIG. 55, when the magnetic field intensity having a negative polarity is increased to zero, for example, the coercive force becomes $H_{c1}$. In contrast, when the positive magnetic field intensity decreases to zero, the coercive force becomes $H_{c2}$. The same applies for other values of the externally applied field intensity. Therefore, the magnetic field intensity applied to the magnetic sensor 205 differs depending on the decrease or increase of the applied magnetic field intensity with time. This provides the magnetic sensor 205 with hysteresis characteristics. Consequently, the output signal voltage characteristic of the position detector also has a hysteresis characteristic as shown in FIG. 56, wherein the transferring position of the magnetic sensor 205 is plotted on the abscissa and the output signal voltage of the position detector, amplified by amplifier 211, is plotted on the ordinate. The transferring direction of the magnetic sensor 205 is designated by a double headed arrow indicating the directions $X_1$ (right) and $X_2$ (left). The characteristic curves $X_1$ and $X_2$ correspond to the directions $X_1$ and $X_2$ of the double headed arrow, respectively.

Figure 57:
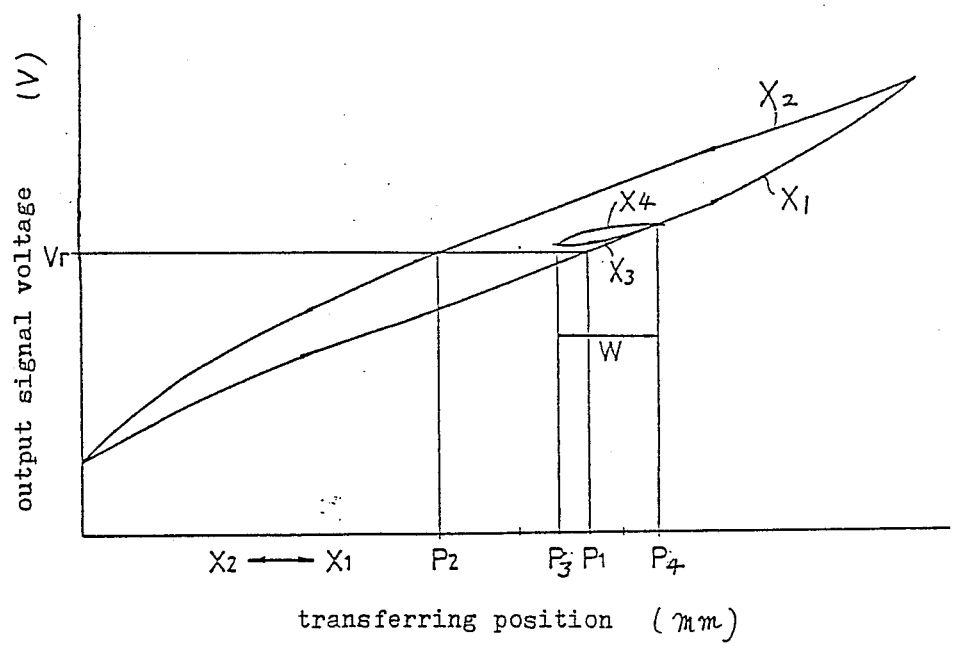
FIG. 57 is a graph of the magnetic characteristic of the hysteresis characteristics of the output signal voltage of the magnetic sensor with respect to the transferring position of the magnetic sensor according to the eighteenth embodiment of FIG. 51.

FIG. 57 is a graph of the relationship between the transferring position of the magnetic sensor 205 and the output signal voltages output therefrom. The reference voltage Vr is set in the comparator 212 and corresponds to the transferring position $P_1$ of FIG. 57. When the magnetic sensor 205 is transferred in the $X_1$ direction starting from the left side, the output signal voltage of the magnetic sensor 205 follows the curve $X_1$, and when the magnetic sensor 205 reaches position $P_1$, the output signal voltage becomes a value equal to Vr. Consequently, a signal, for example, a switching off signal for a pump, is output from the comparator 212 through the output terminal 213. On the other hand, when the magnetic sensor 205 moves in the reverse direction, that is, in the $X_2$ direction, the output signal voltage from the magnetic sensor 205 will follow the curve $X_2$. The output signal voltage decreases to Vr until the magnetic sensor 205 exceeds position $P_1$ and reaches position $P_2$, at which time the comparator 212 outputs another signal, for example, another switching off signal. Thus, there occurs a discrepancy between the positions of the magnetic sensor 205 for outputting a signal corresponding to the same predetermined reference signal voltage Vr.

The position detector is assumed to be used for an oil level sensor of an oil tank in a car, and is floating on the surface of the oil as described before. The oil level is at a specified position corresponding to the position $P_1$ of the magnetic sensor 205. Due to external vibration, the oil level is assumed to go up and down frequently within a range width W, corresponding to the magnetic sensor position between $P_3$ and $P_4$. The output signal voltage of the magnetic sensor 205 will follow a looped curve composed of curves $X_3$ and $X_4$ shown in FIG. 57. Thus, the output signal voltage of the magnetic sensor 205 is always maintained above the reference voltage Vr so that another signal, for example, a switching on signal, is output from the comparator 213. Without the hysteresis characteristic, that is, when the output signal voltage characteristic is represented by a single curve such as that of FIG. 14, every time the magnetic sensor 205 exceeds the position $P_1$ in both the $X_1$ and $X_2$ directions, the comparator 213 issues a switching signal, inducing a chattering problem.

The present invention may be embodied in other specific forms without departing from the spirit or essential characteristics thereof. The presently disclosed embodiments are, therefore, to be considered in all respects as illustrative and not restrictive. The scope of the invention is indicated by the appended claims, rather than the foregoing description, and all changes which come within the meaning and range of equivalency of the claims are, therefore, to be embraced therein.

What is claimed is:

1. A position detecting apparatus comprising:
   a closed magnetic circuit, including:
      magnetic field generating means for generating a magnetic field;
      yoke means, operatively connected to said magnetic field generating means and including a magnetic material and having an inside surface, for guiding at least a portion of said magnetic field therethrough and for emanating a magnetic leakage flux from said inside surface, said magnetic leakage flux having a non-uniform magnetic field intensity distribution between a first position on said yoke means and a second position on said yoke means;
      magnetic sensing means, located along the inside surface of said yoke means, for sensing a magnetic field intensity of said magnetic leakage flux emanating from the inside surface of said yoke means and for outputting an output signal responsive to said sensing; and
      transferring means for mounting said magnetic sensing means and for transferring said magnetic sensing means along the inside surface of said yoke means between said first and second positions.

2. A position detecting apparatus according to claim 1, wherein said magnetic sensing means is a magnetic sensor having a magnetoresistive sensing element.

3. A position detecting apparatus according to claim 2, wherein said magnetoresistive sensing element is a barber-pole type magnetic sensor.

4. A position detecting apparatus according to claim 1, wherein said magnetic field generating means is a permanent magnet.

5. A position detecting apparatus according to claim 4, wherein said yoke means is U-shaped having two straight branches in parallel with each other, and wherein said permanent magnet is positioned between said two straight branches and connected thereto such that the magnetic pole axis of said permanent magnet is substantially perpendicular to said two straight branches.

6. A position detecting apparatus according to claim 4, wherein said yoke means includes a pair of circular yokes in parallel with each other and having first and second ends, wherein a small gap is formed between said first and second ends, said pair of circular yokes connected to each other by a magnetic material located at the first ends of said circular yokes on a first side of said small gap, said permanent magnet being positioned between said circular yokes and connected thereto at the second ends of said circular yokes on a second side of said small gap, so that the magnetic pole axis of said permanent magnet is substantially perpendicular to said pair of circular yokes.

7. A position detecting apparatus according to claim 6, wherein said pair of circular yokes have the same dimension and have a washer-like shape, and wherein the surfaces of each of said pair of circular yokes are substantially parallel to the plane in which said pair of circular yokes lie.

8. A position detecting apparatus according to claim 6, wherein said pair of circular yokes includes a pair of co-axial short cylinders having a first diameter and a second diameter, respectively, the first diameter being larger than the second diameter, the surfaces of said pair of circular yokes being substantially perpendicular to the plane in which said pair of circular yokes lie.

9. A position detecting apparatus according to claim 1, wherein said yoke means includes two yoke plates arranged substantially in parallel to each other and having a distance therebetween, and wherein said yoke plates extend along a path of a predetermined shape.

10. A position detecting apparatus according to claim 9, wherein said two yoke plates extend in a circle.

11. A position detecting apparatus according to claim 9, wherein said two yoke plates extend in a straight line.

12. A position detecting apparatus according to claim 11, wherein said magnetic field generating means includes two permanent magnets positioned between said two yoke plates at both ends of said two yoke plates, respectively, the magnetic pole axes of said two permanent magnets being substantially perpendicular to said two yoke plates and the direction of polarity of the magnetic poles of said two permanent magnets being opposite each other.

13. A position detecting apparatus according to claim 1, wherein said yoke means is U-shaped having two straight branches substantially in parallel to each other, and wherein said permanent magnet is positioned between said two straight branches and is connected thereto, such that the magnetic pole axis of said permanent magnet is substantially perpendicular to said two straight branches.

14. A position detecting apparatus according to claim 1, wherein said yoke means includes two straight plate-like yokes substantially in parallel to each other, and wherein said magnetic field generating means includes two permanent magnets positioned between said two plate-like yokes at both ends of said two plate-like yokes, respectively, the magnetic pole axes of said two permanent magnets being substantially perpendicular to said two plate-like yokes and the direction of polarity of the magnetic poles of said two permanent magnets being opposite each other.

15. A position detecting apparatus according to claim 14, wherein said transferring means is a transferring rod of a non-magnetic material and each of said two permanent magnets has a hole therein, said transferring rod being capable of sliding in a longitudinal direction of said two plate-like yokes.

16. A position detecting apparatus according to claim 1, wherein said yoke means includes two straight plate-like yokes substantially in parallel to each other, and wherein said magnetic field generating means includes first, second and third permanent magnets connected between said two straight plate-like yokes, said first and second permanent magnets positioned at either end of said two straight plate-like yokes and said third permanent magnet positioned between said first and second permanent magnets, the magnetic pole axes of said first, second and third permanent magnets are substantially perpendicular to the plane of said two straight plate-like yokes, and the direction of polarity of said first, second and third magnetic poles are alternately opposite each other, thus forming a magnetic circuit including two closed magnetic sub-circuits connected in series.

17. A position detecting apparatus according to claim 16, wherein said magnetic sensing means includes a pair of magnetoresistive sensing elements arranged substantially in parallel to each other and separated from each other by a predetermined distance.

18. A position detecting apparatus according to claim 17, wherein said first and second permanent magnets each include a first sub-permanent magnet, a non-magnetic spacer block placed on said first sub-permanent magnet, and a second sub-permanent magnet placed on said non-magnetic spacer block, and wherein said their permanent magnet includes two sub-permanent magnets facing each other and having a space therebetween sufficient to allow the passage of said magnetic sensing means.

19. A position detecting apparatus according to claim 18, wherein said transferring means is a transferring rod of a non-magnetic material and said first and second permanent magnets located at each end of said two straight plate-like yokes have a hole in each of said non-magnetic spacer blocks so that said transferring means is capable of sliding in the longitudinal direction of said two straight plate-like yokes.

20. A position detecting apparatus according to claim 1, wherein said yoke means is a single circular yoke, wherein said magnetic field generating means is a tapered wedge-like permanent magnet, and wherein said tapered wedge-like permanent magnet being embedded in said single circular yoke and having a tapered edge oriented toward the inside of said single circular yoke.

21. A position detecting apparatus according to claim 1, wherein said yoke means includes a cylindrical yoke and a rod yoke which is co-axially surrounded by said cylindrical yoke.

22. A position detecting apparatus according to claim 21, further comprising a lid formed of a magnetic material closing one end of said cylindrical yoke and being magnetically connected to the entire cross-sectional area of said rod yoke.

23. A position detecting apparatus according to claim 22, wherein said transferring means comprises a transferring ring slidable along the axis of said rod yoke and having said magnetic sensing means attached thereto.

24. A position detecting apparatus according to claim 22, wherein said cylindrical yoke has an inside wall and said rod yoke has a surface, and wherein said magnetic field generating means is a permanent magnet ring having a co-axial hole therein, said permanent magnet ring positioned between said cylindrical yoke and said rod yoke at an end opposite said lid, said permanent magnet ring being connected to the inside wall of said cylindrical yoke and the surface of said rod yoke.

25. A position detecting apparatus according to claim 21, wherein said magnetic field generating means includes two permanent magnet rings magnetized in a radial direction and positioned between said cylindrical yoke and said rod yoke at both ends of said yokes, respectively, the directions of polarity of the magnetic poles of said two permanent magnet rings being opposite each other.

26. A position detecting apparatus according to claim 25, wherein said transferring means includes a transferring ring ring formed of a non-magnetic material and having an inner hole formed therein, said rod yoke fitted in said inner hole and said transferring ring being capable of sliding in the axial direction of said rod yoke.

27. A position detecting apparatus according to claim 26, further comprising a shielding means, formed of a magnetic material and enclosing the entire position detecting apparatus, for magnetically shielding said position detecting apparatus.

28. A position detecting apparatus according to claim 1, wherein said yoke means has a continuously varying cross-sectional area in the longitudinal direction.

29. A position detecting apparatus according to claim 28, wherein said yoke means includes two straight yokes having inner surfaces substantially parallel to each other and having concave outer surfaces, and wherein said magnetic field generating means includes two permanent magnets positioned between said two straight yokes at each end of said two straight yokes, respectively, the magnetic pole axes of said two permanent magnets being substantially perpendicular to said two straight yokes and the direction of polarity of the magnetic poles of said two permanent magnets being opposite each other.

30. A position detecting apparatus according to claim 29, wherein said concave surfaces are V-shaped.

31. A position detecting apparatus according to claim 29, wherein said concave surfaces are curved surfaces determined by a formula:

$$Y = kX^{3/2}$$

wherein k is a constant, wherein X is the length along the longitudinal direction of said yoke member, and wherein Y is the thickness of said yoke member perpendicular to the longitudinal direction.

32. A position detecting apparatus according to claim 1, wherein said magnetic field generating means is an electromagnet.

33. A position detecting apparatus according to claim 32, wherein said electromagnet includes an exciting coil and a magnetic core formed of a magnetic material extending to form said yoke means.

34. A position detecting apparatus according to claim 32, further comprising an alternating current power supply having a predetermined frequency, wherein said electromagnet is excited by said alternating current power supply.

35. A position detecting apparatus according to claim 1, wherein said magnetic field generating means includes two electromagnets having exciting coils wound in mutually opposite directions, and wherein said yoke means includes a rectangular yoke formed of a magnetic material and having sides which correspond to cores of said two electromagnets.

36. A position detecting apparatus according to claim 35, further comprising an alternating current power supply having a predetermined frequency, wherein said electromagnets are excited by said alternating current power supply.

37. A position detecting apparatus according to claim 1, wherein said inside surface of said yoke means has a notched surface.

38. A position detecting apparatus according to claim 37, wherein said notched surface includes grooves having a specified depth, width and pitch.

39. A position detecting apparatus according to claim 1, further comprising a subsequent circuit, wherein said magnetic sensing means includes a pair of magnetic sensing elements having a compensating function for sensing a magnetic field, for outputting signal voltages of opposite polarities from said respective magnetic sensing elements, and for providing a sum of said output signal voltages as a position detecting signal to said subsequent circuit.

40. A position detecting apparatus according to claim 1, wherein said magnetic sensing means includes a pair of magnetic sensing elements arranged substantially in parallel and having a predetermined distance therebetween, said magnetic sensing means detecting the sensitivity of said magnetic sensing elements.

41. A position detecting apparatus according to claim 1, wherein said magnetic sensing means includes a magnetic sensing element and an enclosure formed of a magnetic material having a magnetic hysteresis characteristic, said magnetic sensing element being enclosed by said enclosure.

42. A position detecting apparatus according to claim 41, wherein said magnetic sensing element is a magnetoresistive sensing element having a magnetizing axis which coincides with the axis of magnetization of said enclosure.

43. A position detecting apparatus according to claim 41, wherein said magnetic material of said enclosure is a resin having a magnetizing property.

44. A position detecting apparatus according to claim 42, wherein said magnetic material of said enclosure is a resin having a magnetizing property.

45. A position detecting apparatus according to claim 41, wherein said enclosure is a cylindrical enclosure.

46. A position detecting apparatus according to claim 45, wherein said magnetic sensing element is a magnetoresistive sensing element having a magnetizing axis which coincides with the axis of magnetization of said enclosure.

* * * * *

UNITED STATES PATENT AND TRADEMARK OFFICE
CERTIFICATE OF CORRECTION

PATENT NO. : 4,810,965

DATED : March 7, 1989

INVENTOR(S) : Yoshiro Fujiwara et al

It is certified that error appears in the above-identified patent and that said Letters Patent is hereby corrected as shown below:

Col. 23, line 17, "their" should be --third--.

Signed and Sealed this

Seventh Day of November, 1989

Attest:

JEFFREY M. SAMUELS

*Attesting Officer*          *Acting Commissioner of Patents and Trademarks*